United States Patent
Gunnarsson et al.

(10) Patent No.: US 10,560,805 B2
(45) Date of Patent: Feb. 11, 2020

(54) PROXIMITY BASED POSITIONING IN A WIRELESS COMMUNICATIONS NETWORK

(71) Applicant: Telefonaktiebolaget LM Ericsson (publ), Stockholm (SE)

(72) Inventors: Fredrik Gunnarsson, Linköping (SE); Feng Yin, Linköping (SE); Yuxin Zhao, Linköping (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 59 days.

(21) Appl. No.: 15/549,336

(22) PCT Filed: Feb. 27, 2015

(86) PCT No.: PCT/SE2015/050231
§ 371 (c)(1),
(2) Date: Aug. 7, 2017

(87) PCT Pub. No.: WO2016/137373
PCT Pub. Date: Sep. 1, 2016

(65) Prior Publication Data
US 2018/0041868 A1    Feb. 8, 2018

(51) Int. Cl.
*H04W 4/02* (2018.01)
*G01S 5/02* (2010.01)
(Continued)

(52) U.S. Cl.
CPC .......... *H04W 4/023* (2013.01); *G01S 5/0268* (2013.01); *H04B 17/3911* (2015.01);
(Continued)

(58) Field of Classification Search
CPC ....... H04W 4/023; G01S 5/021; H04B 17/318
(Continued)

(56) References Cited

U.S. PATENT DOCUMENTS 6,445,917 B1   9/2002 Bark et al.
9,215,562 B1 * 12/2015 Banin .................. H04W 4/023
(Continued)

FOREIGN PATENT DOCUMENTS

WO    2012024516 A2    2/2012
WO    2014024005 A1    2/2014

OTHER PUBLICATIONS

Lisheng Xu; Ke Wang; Yuqi Jiang; Feifei Yang; Yuhang Du; Qingchao Li, "A study on 2D and 3D weighted centroid localization algorithm in Wireless Sensor Networks," in Advanced Computer Control (ICACC), 2011 3rd International Conference, pp. 155-159, Jan. 2011.*

(Continued)

*Primary Examiner* — Shahriar Behnamian
(74) *Attorney, Agent, or Firm* — Sage Patent Group

(57) ABSTRACT

A method performed by a network node or a wireless communications device for determining a reporting threshold related to proximity based positioning in a wireless communications network. For each of a plurality of candidate reporting thresholds the network node or the wireless communications device calculates a corresponding localization accuracy metric based on a deployment information related to a deployment of the wireless communications network, an evaluation position related to the evaluation of a received signal, a propagation model relating the evaluation position and the evaluation of the received signal, and the respective candidate reporting threshold. The network node or the wireless communications device then determines the reporting threshold based on the plurality of corresponding localization accuracy metrics.

20 Claims, 13 Drawing Sheets

(51) Int. Cl.
  *H04B 17/391* (2015.01)
  *H04B 17/318* (2015.01)
  *H04W 64/00* (2009.01)
  *H04W 84/12* (2009.01)

(52) U.S. Cl.
  CPC ......... *H04B 17/318* (2015.01); *H04W 64/003* (2013.01); *H04W 84/12* (2013.01)

(58) Field of Classification Search
  USPC ...................................................... 455/456.3
  See application file for complete search history.

(56) References Cited

U.S. PATENT DOCUMENTS

| | | | | |
|---|---|---|---|---|
| 2008/0080441 | A1* | 4/2008 | Park ...................... | H04W 64/00 370/338 |
| 2011/0159891 | A1* | 6/2011 | Segall ................... | H04W 64/00 455/456.3 |
| 2012/0154218 | A1* | 6/2012 | Mia ......................... | G01S 5/06 342/378 |
| 2012/0182144 | A1* | 7/2012 | Richardson ............. | G01S 5/021 340/539.13 |
| 2013/0217412 | A1* | 8/2013 | Segall ................... | H04W 64/00 455/456.1 |
| 2013/0288705 | A1* | 10/2013 | Ahn ...................... | H04W 64/00 455/456.1 |
| 2013/0336366 | A1* | 12/2013 | Mia ...................... | H04B 1/7103 375/142 |
| 2014/0073356 | A1* | 3/2014 | Siomina ................ | G01S 5/0205 455/456.2 |
| 2015/0055492 | A1* | 2/2015 | Gao, Jr. ................ | H04W 4/023 370/252 |

OTHER PUBLICATIONS

International Search Report and Written Opinion dated Nov. 9, 2015 for International Application Serial No. PCT/SE2015/050231, International Filing Date: Feb. 27, 2015 consisting of 13-pages.

Gudmundson, "Correlation Model for Shadow Fading in Mobile Radio Systems," Electronic Letters, vol. 27, No. 23, pp. 2145-2146, Nov. 7, 1991 consisting of 2-pages.

Xu et al., "A Study on 2D and 3D Weighted Centroid Localization Algorithm in Wireless Sensor Networks," Advanced Computer Control (ICACC), 2011 3rd International Conference on, pp. 155-159, Jan. 18-20, 2011 consisting of 5-pages.

Wang et al., "Localization Based on Adaptive Regulated Neighborhood Distance for Wireless Sensor Networks with a General Radio Propagation Model," Sensors Journal, IEEE, vol. 14, No. 11, pp. 3754-3762, Nov. 2014 consisting of 9-pages.

* cited by examiner

US 10,560,805 B2

PROXIMITY BASED POSITIONING IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2015/050231, filed Feb. 27, 2015 entitled "PROXIMITY BASED POSITIONING IN A WIRELESS COMMUNICATIONS NETWORK," the entirety of which is incorporated herein by reference.

TECHNICAL FIELD

Embodiments herein relate to a network node, a wireless communications device and methods therein. In particular they relate to proximity based positioning in a wireless communications network.

BACKGROUND

Wireless Communications Networks

Embodiments herein are applicable to both cellular and non-cellular wireless communications networks.

In a typical cellular wireless communications network, wireless communication devices, also known as mobile stations and/or User Equipments (UEs), communicate via a Radio Access Network (RAN) to one or more core networks. The RAN covers a geographical area which is divided into cell areas, with each cell area being served by a base station, e.g., a Radio Base Station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

A Wireless Local Area Network (WLAN) is a wireless non-cellular computer network that links two or more devices using a wireless distribution method within a limited area such as a home, school, computer laboratory, or office building. This gives users the ability to move around within a local coverage area and still be connected to the network, and may provide a connection to the wider Internet. Most modern WLANs are based on IEEE 802.11 standards, marketed under the Wi-Fi brand name.

Positioning Techniques

Over the past few years, indoor positioning using wireless communications networks has received considerable attention due to the ever increasing demand on location-awareness in various sectors. So far, most of the efforts have been made to increase the localization accuracy using advanced technologies, for instance statistical sensor fusion attempts to optimally fuse different types of position-related measurements, such as Round-trip-Time-Of-Arrival (RTOA), Received-Signal-Strength (RSS), Angle-Of-Arrival (AOA), speed, and acceleration measured from indoor wireless infrastructures. Such indoor wireless infrastructures may for instance be Wi-Fi networks and Bluetooth Low-Energy (BLE) networks and Inertial Measurement Units (IMU).

Among other types of radio measurements, RSS is more widely used for indoor positioning owing to the fact that no additional hardware is required in the existing wireless communication networks, such as ZigBee networks, Wi-Fi networks, BLE networks, as well as LTE mobile networks.

There exist various RSS based positioning techniques. For one example, RSS fingerprinting is one of the most commonly used positioning techniques. But before such a positioning system may be used to estimate a position, an RSS fingerprint database or a radio map must be constructed beforehand. Each entry in the database is a mapping between a position and a location dependent RSS fingerprint. Statistical modeling is also widely used for RSS based indoor positioning. The resulting probabilistic methods take advantage of the statistical properties of the RSS model parameters.

Recently, another research area, namely proximity based indoor positioning, is becoming more and more popular. This is due to nice features and large market penetration brought about by the resulting low-cost and low-complex positioning system. One way of obtaining proximity information is to compare RSS with a reporting or proximity threshold, denoted as $P_{th}$ in the sequel. The proximity of a target device, such as a wireless communications device, to a reference network node, such as a base station or BLE beacon, is defined as zero for an RSS value below the threshold value $P_{th}$, and defined as 1 for an RSS value above the threshold value $P_{th}$. This is also expressed in the equation below.

$$\text{Proximity} \triangleq \begin{cases} 0, & RSS \leq P_{th} \\ 1, & RSS > P_{th} \end{cases}.$$

Thus, a proximity measurement obtained in the above way reveals whether or not a target of interest is in the coverage area, which depends on the threshold, of a reference network node. The reference network node serves as a transmitter with preferably low transmit power and transmits broadcast signals and information regularly, or according to a known pattern. The information may contain useful information such as sensor ID, position, network configurations, etc. The reference network nodes may also only transmit a reference signal or identifier, and any other information about the deployment has to be retrieved from some inventory database.

Instead of giving an accurate position estimate with unaffordable cost, the ambition of a proximity based positioning system is to promptly, possibly in real time, identify which zone the target of interest is in, or about to enter, or leave and trigger events or performance reports accordingly. For example, proximity measurements may be subject to event-driven reporting to a network node. This will provide the network node with a time series of reporting events, from which the network node may determine the proximity state of a wireless communications device with respect to transmitters of the RSS-signal. The resulting system will revolutionize mobile applications that are convenient to use in shopping malls, museums, hospitals, hotels, offices, and airports among other sites.

Events Driven Reporting and Measurements

In many wireless communication networks, event driven reporting and measurements are widely used. One example of such event based reporting of measurements is described in "Mobile Station Measurements with Event-Based Reporting", Gunnar Bark, Joakim Bergström, Walter Muller, September 2002, U.S. Pat. No. 6,445,917 B1. A terminal measures one or more radio-related parameters for one or more cells. The measured parameters are evaluated at the terminal with respect to a predetermined event or condition. Then, the terminal sends a report to the wireless communications network based on the evaluation, e.g., the predetermined event occurs or the condition is satisfied. The wireless communications network may take some action, if appropriate, using the report, e.g., to perform a handover operation. The interaction between the network node and the terminal may be via a Radio Resource Control (RRC) protocol in case the network node is a radio access network node. It can also be an LTE Positioning Protocol (LPP) in case the network node is an Evolved Serving Mobile Location Center (E-SMLC). It may also be via an Access Network Discovery and Selection Function (ANDSF) between a terminal and a network node. It may also be via protocols over the application layer.

Problems with Existing Solutions

Existing positioning methods using RSS measurements may have different problems which remain to be solved.

For example, positioning methods such as fingerprinting require a lot of efforts and have high complexity. This on one hand may increase terminal complexity, which is not desirable. On the other hand, high complexity will further lead to non-scalability from the network side. For example, a lot of computation may be required for the network if there are too many users. Current positioning techniques also require heavy signaling overhead. For example, a lot of data, e.g. RSS measurements, need to be sent to the network.

Furthermore, a badly chosen reporting threshold results in degradation of the positioning performance.

SUMMARY

An object of embodiments herein is to improve the performance of positioning in wireless communications networks.

According to a first aspect of embodiments herein, the object is achieved by a method performed by a network node for determining a reporting threshold related to proximity based positioning in a wireless communications network.

For each of a plurality of candidate reporting thresholds the network node calculates a corresponding localization accuracy metric based on:

a deployment information related to a deployment of the wireless communications network, an evaluation position related to the evaluation of a received signal, a propagation model relating the evaluation position and the evaluation of the received signal, and the respective candidate reporting threshold.

The network node then determines the reporting threshold based on the plurality of corresponding localization accuracy metrics.

According to a second aspect of embodiments herein, the object is achieved by a network node for determining a reporting threshold related to proximity based positioning in a wireless communications network.

The network node is configured to calculate for each of a plurality of candidate reporting thresholds a corresponding localization accuracy metric based on:

a deployment information related to a deployment of the wireless communications network, an evaluation position related to the evaluation of a received signal, a propagation model relating the evaluation position and the evaluation of the received signal, and the respective candidate reporting threshold.

The network node is further configured to determine the reporting threshold based on the plurality of corresponding localization accuracy metrics.

According to a third aspect of embodiments herein, the object is achieved by a method performed by a wireless communications device for determining a reporting threshold related to proximity based positioning in a wireless communications network.

For each of a plurality of candidate reporting thresholds the wireless communications device calculates a corresponding localization accuracy metric based on:

a deployment information related to a deployment of the wireless communications network, an evaluation position related to the evaluation of a received signal, a propagation model relating the evaluation position and the evaluation of the received signal, and the respective candidate reporting threshold.

The wireless communications device then determines the reporting threshold based on the plurality of corresponding localization accuracy metrics.

According to a fourth aspect of embodiments herein, the object is achieved by a wireless communications device for determining a reporting threshold related to proximity based positioning in a wireless communications network. The wireless communications device is configured to calculate for each of a plurality of candidate reporting thresholds a corresponding localization accuracy metric based on:

a deployment information related to a deployment of the wireless communications network, an evaluation position related to the evaluation of a received signal, a propagation model relating the evaluation position and the evaluation of the received signal, and the respective candidate reporting threshold.

The wireless communications device is further configured to determine the reporting threshold based on the plurality of corresponding localization accuracy metrics.

Since the network node and/or the wireless communications device determines the reporting threshold based on the plurality of corresponding localization accuracy metrics the threshold is determined in an improved way because the localization error is reduced or kept within a required range. This improves the performance of the network node and/or the wireless communications device and the wireless communications network.

An advantage with embodiments herein is that they are flexible to use with any reasonable radio propagation model, for instance a conventional linear propagation model or a piece-wise linear propagation model or an advanced Gaussian Process Regression (GPR) model.

A further advantage is that embodiments herein may use merely one binary bit '0' or '1' to represent the proximity information, i.e. connected or disconnected between a reference network node, e.g., a base station, a Wi-Fi router or a Bluetooth beacon and a wireless communications device. The wireless communications device may be a mobile phone or other smart devices. Thus embodiments herein require fairly low communication bandwidth for reporting measurements, and a fairly small data base for position mapping.

Embodiments herein enable design of low-complex and low-cost positioning algorithms using merely the proximity information, which are nevertheless capable of providing location information for a plethora of event-driven and value-added applications, e.g. get a notification, push a coupon or an advertisement, etc.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified. As mentioned above, existing positioning methods using RSS measurements may have different problems which remain to be solved.

A badly chosen reporting threshold results in degradation of the positioning performance.

Furthermore, current positioning techniques usually require heavy signaling overhead. For example, a lot of data, e.g. RSS measurements, is sent to the network.

Embodiments herein determine a reporting threshold for favorable positioning performance based on localization accuracy metrics. The localization accuracy metrics are calculated based on deployment information related to a deployment of the wireless communications network, an evaluation position related to the evaluation of a received signal, a propagation model relating the evaluation position and the evaluation of the received signal, and a set of candidate reporting thresholds.

A wireless communications device may then be configured with the reporting threshold.

When the wireless communications device has been configured with the reporting threshold, coarse proximity measurements may be subject to event-driven reporting to a network node. This will provide the network node with a time series of reporting events, from which the network node is able to determine the proximity state of a wireless communications device with respect to network transmitters. The target of interest, i.e. the wireless communications device, may be more accurately positioned fusing the proximity measurements either in a mobile centric manner or in a network centric manner. According to estimation theory and information theory as well, more information, here the additional proximity measurements, leads to better inference results, as long as the information is reasonably fused.

Figure 1:
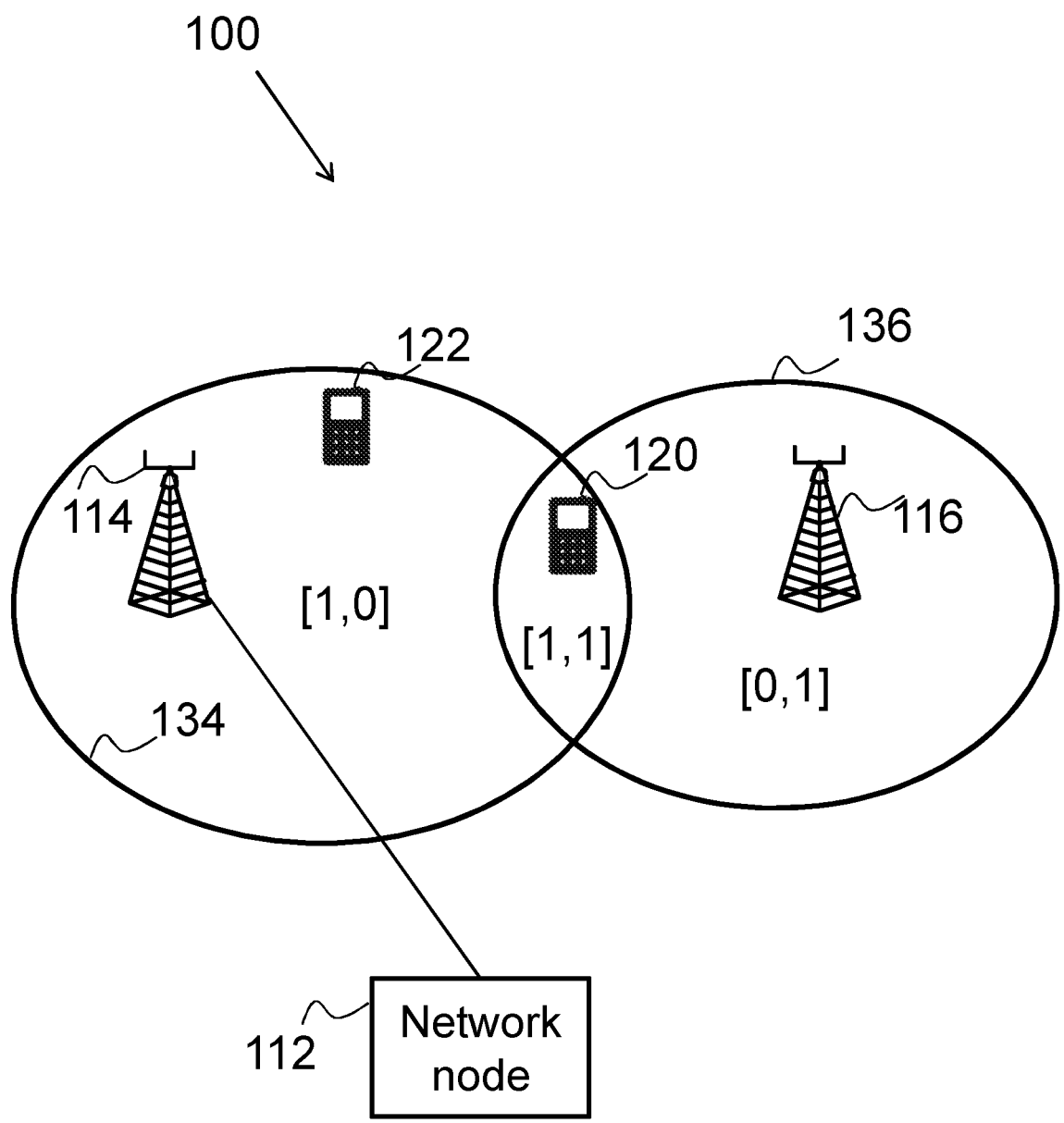
FIG. 1 is a schematic block diagram illustrating a wireless communications network in which embodiments herein may be implemented.

Embodiments herein relate to wireless communication networks in general. FIG. 1 is a schematic overview depicting a wireless communications network 100 also known as radio communications network, a telecommunications network or similar. The wireless communications network 100 may comprise one or more Radio Access Networks (RAN) and one or more Core Networks (CN). The wireless communications network 100 may use a number of different technologies, such as BLE, Wi-Fi, Worldwide Interoperability for Microwave Access (WiMAX), Ultra Mobile Broadband (UMB), Long Term Evolution (LTE), LTE-Advanced, Wideband Code Division Multiple Access (WCDMA), Global System for Mobile communications/Enhanced Data rate for GSM Evolution (GSM/EDGE), just to mention a few possible implementations. The wireless communications network 100 is exemplified herein as a BLE network.

The wireless communications network 100 comprises network nodes capable of communicating with wireless communications devices. For example, the wireless communications network 100 comprises a network node 112 capable of communicating with wireless communications devices. In some embodiments the network node 112 is a network node capable of radio communication, e.g. a base station. The network node 112 may also be referred to as radio base station and e.g. a NodeB, an evolved Node B (eNB, eNode B), a base transceiver station, Access Point Base Station, base station router, or any other network unit capable of communicating with the wireless communications devices.

In some other embodiments the network node 112 is a network node that communicates with the wireless communications devices via a radio network node. In this case the network node 112 may for example be an RNC, a Mobility Management Entity (MME), or a network node comprising a fusion center.

The wireless communications network 100 further comprises reference network nodes, such as a reference network node 114. The wireless communications network 100 may further comprise a second reference network node 116. The reference network nodes may be radio network nodes such as a base station, a Wi-Fi router or a Bluetooth beacon.

In the wireless communications network 100, a wireless communications device 120, also known as a mobile station, wireless device, a user equipment and/or a wireless terminal, communicates with the wireless communications network 100 via radio network nodes. There may of course be more than one wireless communications device in the wireless communications network 100, for example a second wireless communications device 122.

It should be understood by the person skilled in the art that "communication device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station.

In embodiments herein the reference network node 114 has a radio coverage area 134 defined by a reporting threshold. Similarly the second reference network node 116 may have a second radio coverage area 136 defined by a second reporting threshold.

FIG. 1 also illustrates how RSS positioning within the coverage areas may be performed. Instantaneous RSS measurements are made by the wireless communications device 120 by measuring signals from the reference network node 114 and the second radio network node 116.

The proximity of the wireless communications device 120 to the reference network node 114 and to the second radio network node 116 is defined as zero for an RSS value below the threshold value $P_{th}$, and defined as 1 for an RSS value above the threshold value $P_{th}$.

A first set of measurements at a first time is denoted by [1, 1] and imply that the wireless communications device 120 is probably residing in a zone formed by an intersection of the first coverage area 134 and the second coverage area 136. When the wireless communications device 120 moves to the right, it will probably receive instantaneous RSS measurements denoted by [0, 1] at a second time.

Figure 2:
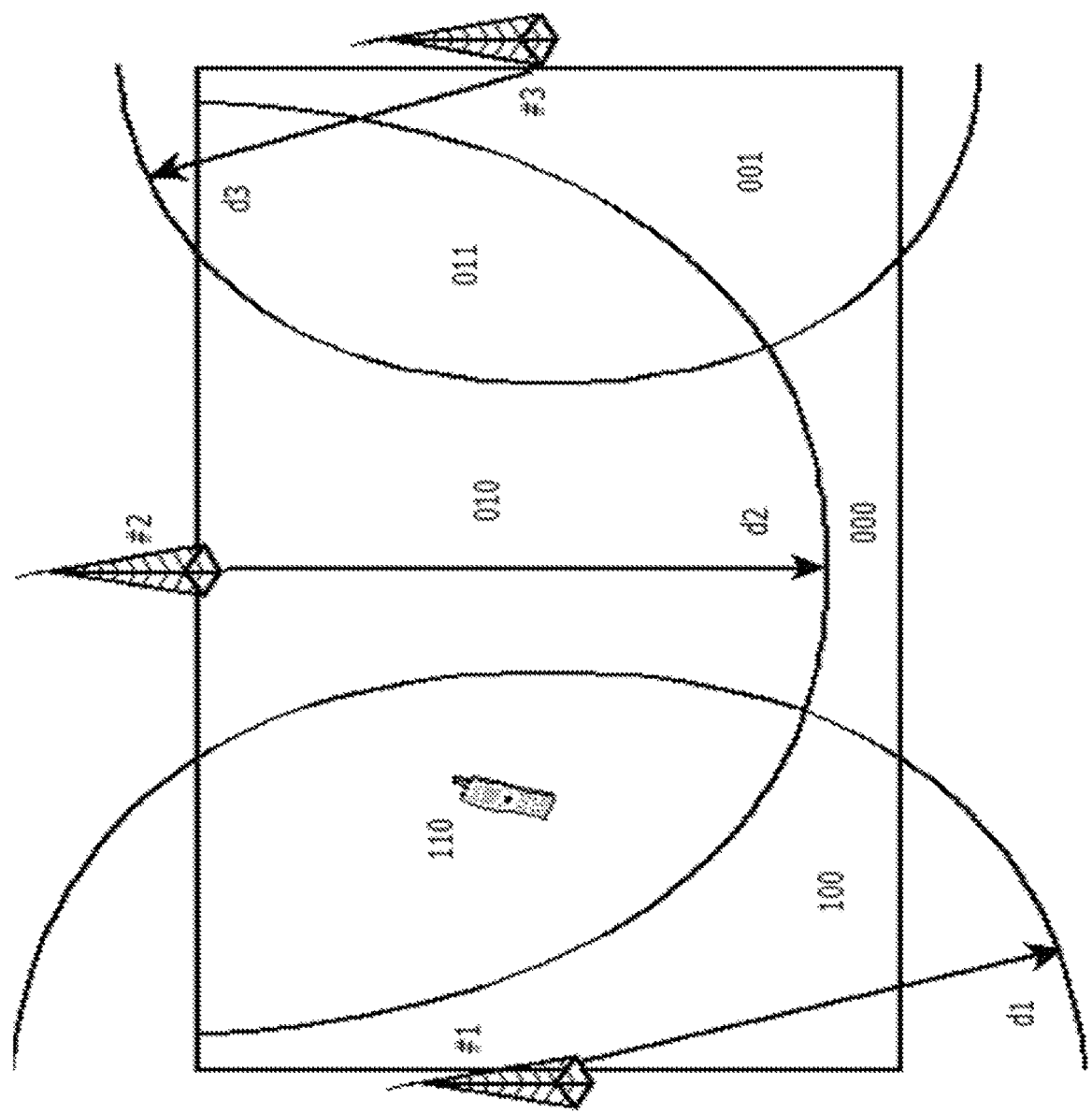
FIG. 2 is a schematic block diagram illustrating further details of a wireless communications network in which embodiments herein may be implemented.

FIG. 2 is a further illustration of how RSS positioning within coverage areas may be performed. Three reference network nodes, such as the reference node 114 and the second reference node 116 and a third reference node, with IDs #1-3 are deployed as transmitters to locate a mobile receiver, such as the wireless communications device 120.

The reference nodes have known positions. The reference nodes broadcast data packages to the receivers, e.g. to a mobile phone. The maximum coverage radius of the ith reference node is determined by $d_i$, which is dependent on the RSS threshold $P_{th}$. An instantaneous RSS measurement being larger than the threshold implies that the mobile resides more probably inside the coverage area. The instantaneous RSS measurements 110 measured from all reference nodes at time t imply that the mobile is more probably residing in the zone formed by the intersection of the first and second coverage areas. When the receiver moves forwards to the zone on its right, it will more probably receive instantaneous RSS measurements 010 at time t+1.

It should be noted that embodiments herein are not mutually exclusive. Components from one embodiment may be tacitly assumed to be present in another embodiment and it will be obvious to a person skilled in the art how those components may be used in the other exemplary embodiments.

As mentioned above, the localization accuracy metrics used to determine the reporting threshold are calculated based on deployment information and on a propagation model. Therefore, deployment modelling and propagation modelling that may be used in embodiments herein will first be shortly presented.

Deployment Modeling

In embodiments herein, an indoor positioning scenario is considered where a number of N reference network nodes, such as the reference node 114 and the second reference node 116 are deployed. The reference network nodes may be radio base stations, BLE beacons, W-Fi routers, ZigBee devices, or a combination. The reference network nodes are often placed rather uniformly in a service area and mounted either on a ceiling or high on a wall to give a panoramic view. The geographical position of a reference network node, $P_r$, is assumed to be known a priori. A reference network node serves as a transmitter with preferably low transmit power $P_T$ and transmits broadcast signals and information regularly, or according to a known pattern. The information may comprise useful information such as identification of a sensor in the reference network node, position of the reference network node, network configurations, etc. The reference network nodes may also only transmit a reference signal or identifier, and any other information about the deployment has to be retrieved from some inventory database.

Furthermore, service area information is obtained as part of the deployment information. A service area may be seen as an area within which positioning support is desired. The service area may also be represented by an evaluation set of positions, $X^*$, which comprises known sample positions $p_i^* = (x_i^*, y_i^*, z_i^*)$, i=1, 2, ..., $|X^*|$. These positions may also be considered to be of varied importance quantified by weighting factors $w_i^*$, i=1, 2, ..., $|X^*|$.

Introduction to RSS Modeling

In the literature, there exist various RSS models. Their suitability, however, may depend on a lot of different factors. Once a RSS model is defined, the corresponding model parameters may be obtained from experience or from representative similar service areas or from lookup tables. The model parameters may also be calibrated either offline given a batch of available RSS measurements or online given RSS measurements that come in sequentially.

In what follows, three representative model structures that may be used in different embodiments herein will be presented. However, the details of the three models will be presented after the presentation of the actions for determining a reporting threshold related to proximity based positioning in the wireless communications network 100 according to embodiments herein in order not to obscure the essence of the embodiments.

The first two models are the classical linear log-distance model and the piece-wise linear log-distance model. These two models represent an RSS measurement in terms of the one dimensional (1-D) distance between the transmitter and the receiver.

A nonlinear GPR model, which represents an RSS measurement nonlinearly in terms of the 2-D or 3-D geographical position, is further presented. The GPR is more suitable for complex indoor environments.

Different models leads to different calibration performances and also different calibration times. For example, the linear log-distance model and the piece-wise linear log-distance model are simpler to use than the GPR model. The GPR model is more realistic but requires more calibration time. The computational complexity for the three mentioned models is lowest for the linear log-distance model and highest for the GPR model.

In one embodiment, the model parameters are selected based on experience from similar environments or from the literature. In the detailed description of the models below comments are also made regarding model parameter calibration aspects given a calibration set of M RSS measurements of reference network node signals at different calibration locations $p_j$, $j=1, 2, \ldots, M$.

Actions for determining a reporting threshold related to proximity based positioning in the wireless communications network 100 according to embodiments herein will now be described in relation to FIG. 3, FIG. 4, FIG. 5 and FIG. 7.

Figure 3:
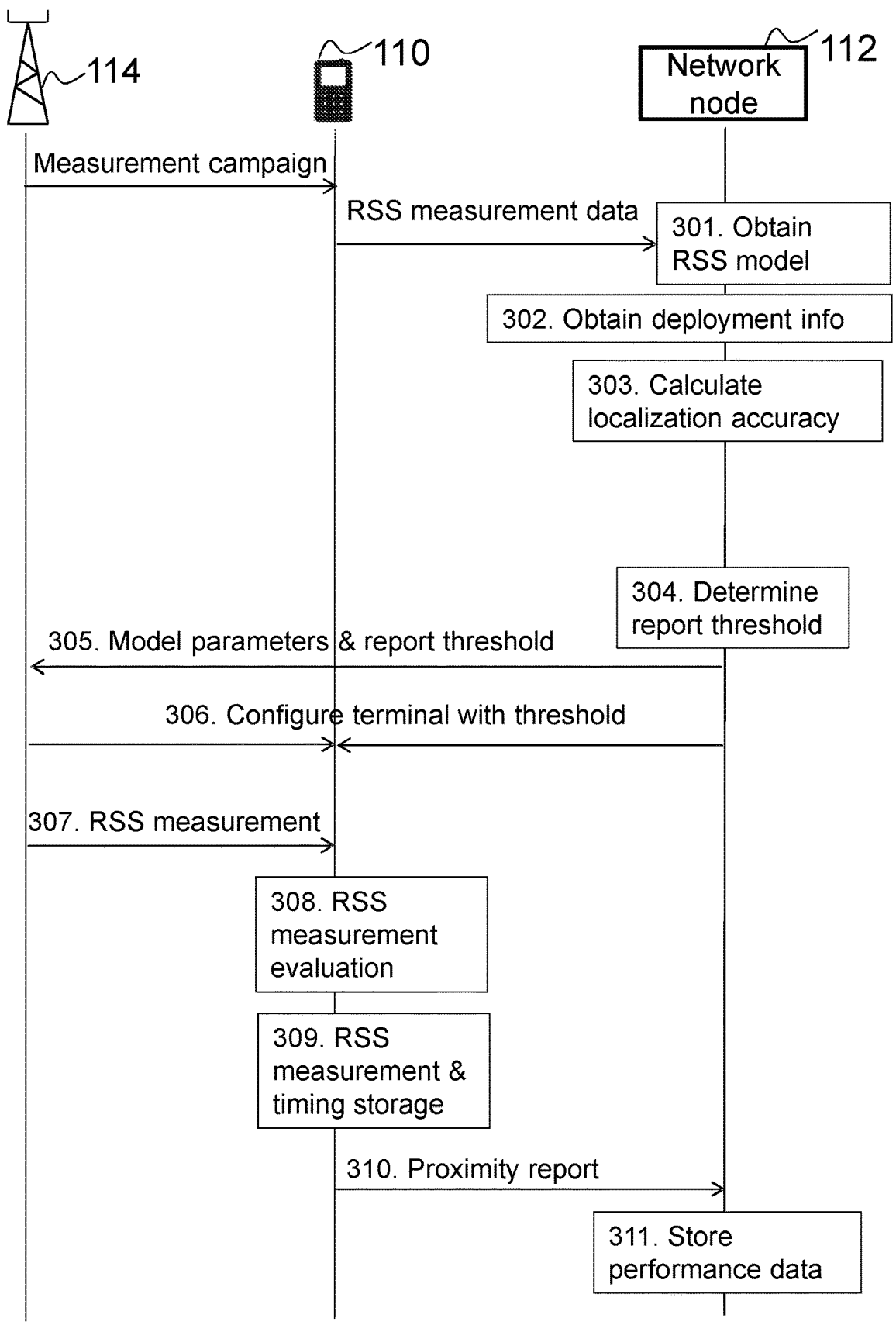
FIG. 3 is a combined signalling diagram and flow chart illustrating embodiments of a network node centric method in a wireless communications network.

FIG. 3 is a combined signalling diagram and flow chart that describes a first scenario corresponding to a network node centric method for determining the reporting threshold according to embodiments herein.

Figure 4:
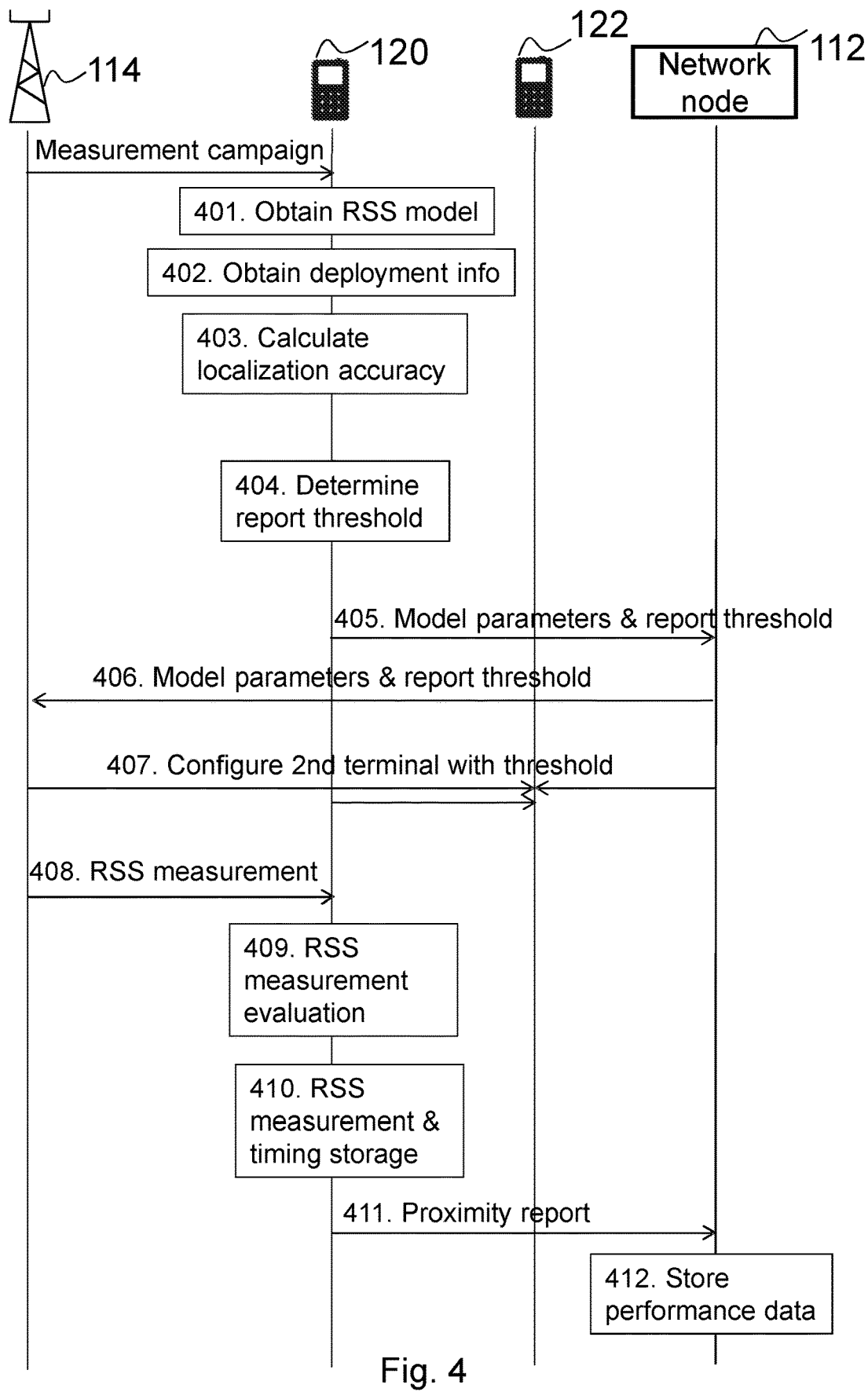
FIG. 4 is a combined signalling diagram and flow chart illustrating embodiments of a wireless communications device centric method in a wireless communications network.

FIG. 4 is another combined signalling diagram and flow chart that describes a second scenario corresponding to a wireless communications device centric method for determining the reporting threshold according to embodiments herein.

Figure 5:
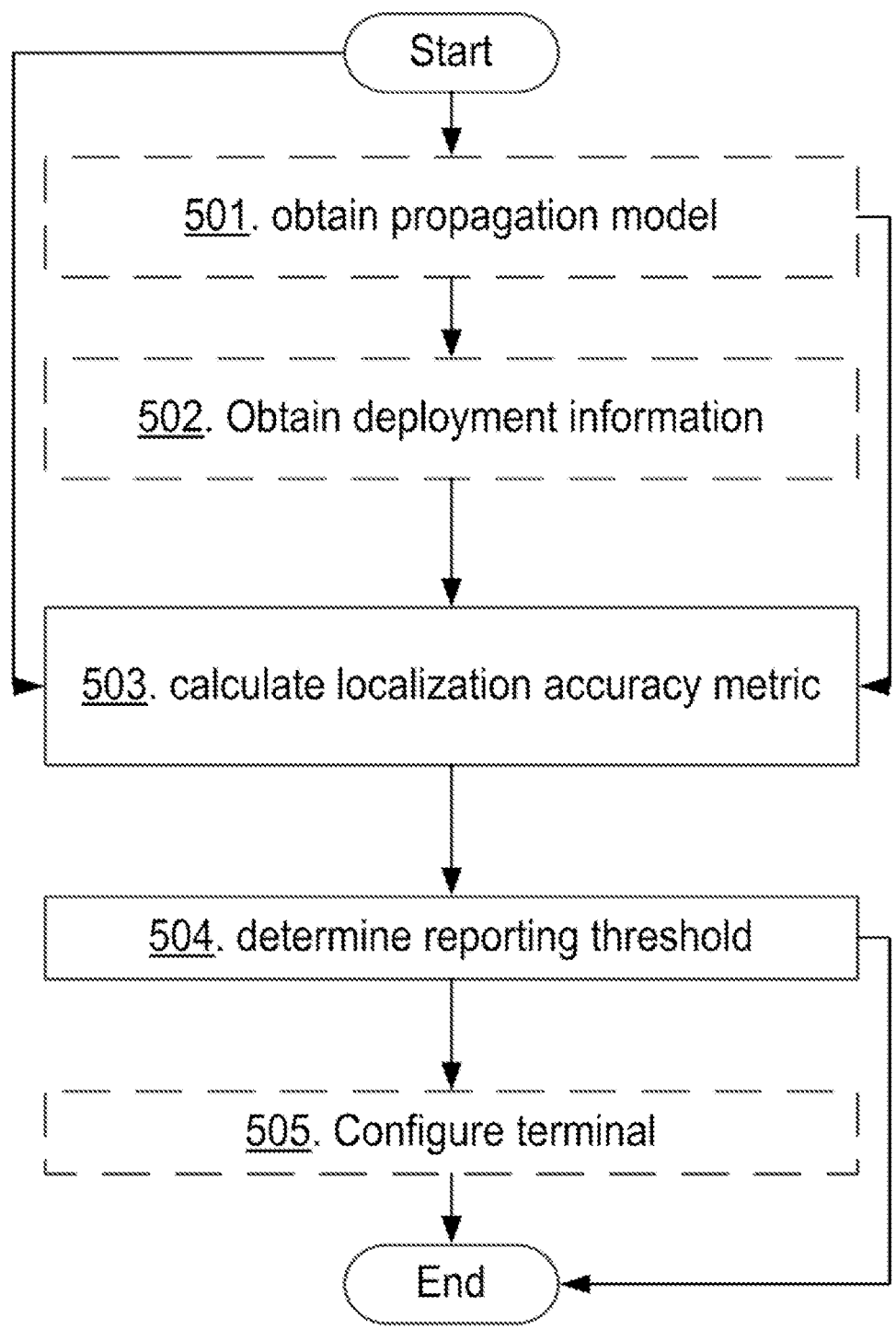
FIG. 5 is a flowchart illustrating embodiments of a method in a network node.

FIG. 5 is a flowchart that describes a method in the network node 114 for determining the reporting threshold according to embodiments herein.

Figure 7:
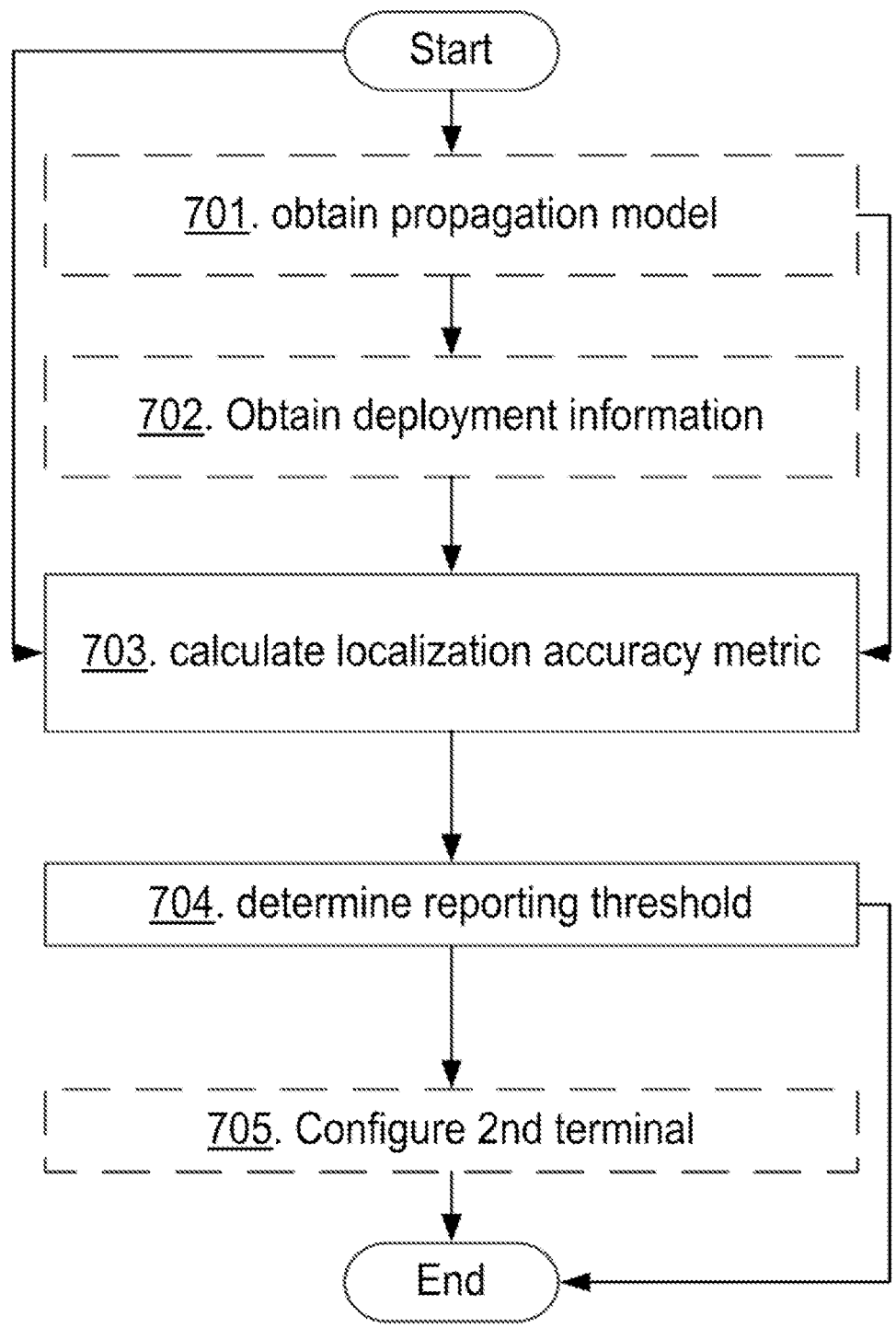
FIG. 7 is a flowchart illustrating embodiments of a method in a wireless communications device.

FIG. 7 is a flowchart that describes a method in the wireless communications device 120 for determining the reporting threshold according to embodiments herein.

The embodiments described below are applicable to both the method in the network node 112 and to the method in the wireless communications device 120.

As mentioned above, embodiments herein determine a reporting threshold for favorable positioning performance based on localization accuracy metrics. The localization accuracy metrics are calculated based on deployment information related to a deployment of the wireless communications network, an evaluation position related to the evaluation of a received signal, a propagation model relating the evaluation position and the evaluation of the received signal, and a set of candidate reporting thresholds.

Action 301, 401, 501, 701

As an input to the calculation of the reporting threshold, a propagation model may be obtained.

In one embodiment, the propagation model is obtained through a training measurement phase.

In another embodiment, the propagation model is selected among established models. The propagation model may e.g. be an RSS model.

Action 302, 402, 502, 702

As a further input to the calculation of the reporting threshold, deployment information may be obtained.

The deployment information may comprise any one or more out of: a transmitter location, a transmitter power and building information.

In some embodiments an area definition within which positioning support is desired is obtained as part of the deployment information. The defined area may correspond to the service area.

Action 303, 403, 503, 703

For each of a plurality of candidate reporting thresholds the network node 114 or the wireless communication device 120 calculates a corresponding localization accuracy metric based on:

the deployment information related to a deployment of the wireless communications network 100, an evaluation position related to the evaluation of a received signal, a propagation model relating the evaluation position and the evaluation of the received signal, and the respective candidate reporting threshold.

In other words, for a sample position $p_i^* \in X^*$ of the evaluation set, the corresponding localization accuracy metric $f(p_i^*, P_{th})$ is evaluated based on the deployment information and the RSS model. As mentioned above, different models lead to different calibration performances and also different calibration times.

The candidate thresholds may be selected from a finite interval, such as $[P_{th}^{min}, P_{th}^{max}]$.

In some embodiments the localization accuracy metric is a localization Root-Mean-Square-Error, RMSE.

The RMSE is often used to evaluate a localization algorithm. The localization RMSE may be defined as the square root of the trace of the inversed Fisher Information Matrix (FIM)

$$f(p_i^* \cdot P_{th}) \triangleq \sqrt{tr(\text{FIM}^{-1}(p_i^* \cdot P_{th}))}.$$

The FIM may be computed in a snapshot manner and under the assumption that the sample positions are deterministic. A detailed description of a calculation of the FIM will be given later. Other localization metrics may also be used.

The localization RMSE may be calculated based on a Cramer-Rao Bound (CRB) analysis. Extension to other bounds such as a Bayesian bound or a Barankin bound is straight-forward.

Note also that the calibration and evaluation sets are normally different. However, it is also possible that a data point exists in both sets.

In some embodiments the corresponding localization accuracy metric is related to a plurality of evaluation positions. The corresponding localization accuracy metric may for example comprise a plurality of corresponding localization accuracy metrics. The corresponding localization accuracy metric may be calculated for every sample position $p_i^* \in X^*$ of the evaluation set, based on the deployment information and the RSS model.

When the localization accuracy metric is related to the plurality of evaluation positions the localization accuracy metric may be a statistical metric over a plurality of corresponding localization accuracy metrics, each related to an evaluation position. An example of the statistical metric is the average $$\bar{f}(P_{th}) = \sum_{i=1}^{|X^*|} w_i^* \cdot f(p_i^*; P_{th})$$

where $\bar{f}(P_{th})$ is a short-hand notation of $\bar{f}$ (RSS model, deployment, $P_{th}$).

In case weighted positions are considered for the evaluation set, then the statistical average may be weighted accordingly.

Another statistical metric is a percentile over the localization accuracy metric for all evaluation set positions. Example of percentiles are the 50-, 67-, 80- and 95-percentiles.

Action 304, 404, 504, 704

The reporting threshold is then determined based on the plurality of corresponding localization accuracy metrics. In the network node centric embodiments the network node 112 determines the reporting threshold based on the plurality of corresponding localization accuracy metrics.

In the corresponding wireless communications device centric embodiments the wireless communications device 120 determines the reporting threshold based on the plurality of localization accuracy metrics.

For example, as will be further explained below, by comparing the localization accuracy metrics calculated as described above the network node 112 and/or the wireless device 120 are able to determine or select a reporting threshold which will reduce the localization error and thus improve the performance of the network node and/or the wireless communications device and of the wireless communications network.

The reporting threshold may further be determined based on that the corresponding localization accuracy metric fulfils a requirement related to localization accuracy. The requirement may for example be that the corresponding localization accuracy metric is below a certain value, $\bar{f}_0$, $$P_{th}^{opt} \in [P_{th}: \bar{f}(\text{RSS model,deployment},P_{th}) \leq \bar{f}_0]$$

Determining the reporting threshold may be further based on an optimization of the localization accuracy metric with respect to the reporting threshold.

One example is the reporting threshold that minimizes the localization accuracy metric, e.g. the average, for all evaluation set positions:

$$P_{th}^{opt} = \min_{P_{th}} \bar{f}(\text{RSS model,deployment},P_{th}).$$

In one embodiment, the threshold is selected as a function of the predicted positioning accuracy in consideration of the propagation model and deployment information. The threshold is further selected to correspond to any one or more out of a sufficient positioning accuracy in the service area, an optimized accuracy in the service area, a maximum coverage of the service area and achievement of a certain localization accuracy at 67 or 95 percentile.

Thus, by determining the reporting threshold according to embodiments herein the localization error is reduced or kept within a required range which will improve the performance of the network node and/or the wireless communications device, and the wireless communications network.

In one embodiment, one threshold for reporting of all reference network nodes is determined.

In another embodiment, the threshold is determined for a specific reference network node, or a group of reference network nodes.

Optionally, the determining action may comprise a calibration step of the RSS model.

Actions 305-306, 405-407, 505, 705

In order for the wireless communications device 120 and the second wireless communications device 122 to use the determined reporting threshold the wireless communications devices may be configured with the reporting threshold.

In the network node centric embodiments the network node 112 may configure the wireless communications device 120 with the reporting threshold. The configuring may comprise sending the reporting threshold to the wireless communications device 120 via a radio network node, such as the reference network node 114. This is illustrated by actions 305 and 306 in FIG. 3. The sending of the reporting threshold may be performed according to a downlink and/or mesh network communication protocol. The mesh network may e.g. be a BLE mesh, a Zigbee mesh, or any other mesh network.

The sending of the reporting threshold may also be performed according to any of the protocols mentioned on page above in the background, such as RRC, LPP, ANDSF, application layer protocol etc.

The network node 112 may also send the model parameters to the reference node 114, as seen in action 305 in FIG. 3 and in action 406 in FIG. 4. The communication protocols mentioned above may also be used for action 406.

The network node 112 may further configure the second wireless communications device 122 with the reporting threshold, illustrated by action 407. The communication protocols mentioned above may also be used for action 407.

In the corresponding wireless communications device centric embodiments the wireless communications device 120 may configure the second wireless communications device 122 with the reporting threshold.

In some embodiments the wireless communications device 120 may configure the second wireless communications device 122 by sending the threshold directly to the second wireless communications device 122 as illustrated by action 407 in FIG. 4. The sending of the reporting threshold to the second wireless communications device 122 may be performed according to a Peer-to-Peer communication protocol for communications between wireless communications devices. Such a protocol may typically be over the application layer, which means that data is sent via other nodes on lower protocol layers.

In some other embodiments the wireless communications device 120 may configure the second wireless communications device 122 by sending the reporting threshold to the second wireless communications device 122 via the network node 112 and then possibly via a radio network node, such as the reference network node 114. This is illustrated by actions 405-407 in FIG. 4. The sending of the reporting threshold to the second wireless communications device 122 may be performed according to uplink and downlink communication protocols when sending the RSS model parameters and the RSS threshold from the wireless communications device 120 to the network node 112 and from the network node 112 to one or more reference network nodes 114, 116, corresponding to action 405 and 406.

The wireless communications device 120 may further configure itself with the reporting threshold.

The reporting threshold may be pre-configured, or configured via signaling as described above. The RSS threshold may be signaled, i.e. sent, to the wireless device 120 via the reference node 114, or via some other network node.

The wireless communications device 120 may be reconfigured with a new threshold when conditions change to be able to compare the instantaneous RSS measurement with the new threshold and then broadcast feedback and/or measurement report back to the network node 112.

Actions 307, 408

When the determined reporting threshold is configured with the wireless communications device 120 it may be used for triggering measurement reports to the reference nodes, such as the reference node 114 and the second reference node 116.

For this purpose the reference node 114 may transmit an RSS signal which is received by the wireless communications device 120.

Action 308, 409

The wireless communications device 120 may then evaluate the RSS signals that it has measured in order to determine whether to send a measurement report to the network node 112.

Action 309, 410

In some embodiments the wireless communications device 120 stores measurement reports and triggering times and sends these to the network node 112 later in bulk. This may be advantageous since it reduces signaling overhead.

Action 310, 411

The measurement reports from the wireless communications device 120 may be sent to the network node 112 every time a reference node measurement has triggered the reporting threshold. Alternatively, the wireless communications device 120 may store measurement reports and triggering times and send these to the network node 112 in bulk as mentioned above.

In some embodiments the wireless communications device 120 is also configured to report RSS measurements in conjunction with the measurement report. The set of included measurements may be restricted to the triggering reference network node, e.g. the reference network node 114, alone, or may include measurements related to other reference network nodes as well.

Action 311, 412

The network node 112 may be configured to store performance data related to the RSS measurement reporting. The network node 112 may then analyze the stored performance data, e.g. in a statistical way, in order to optimize the wireless communications network 100. The performance data may comprise:

- Number of RSS measurement reports per wireless communications device within a time window
- Time between RSS measurement reports from a wireless communications device
- Reports per reference network node within a time window
- Data separated per wireless communications device type, wireless communications device brand, wireless communications device capability, session status, i.e. active/idle.

Figure 6:
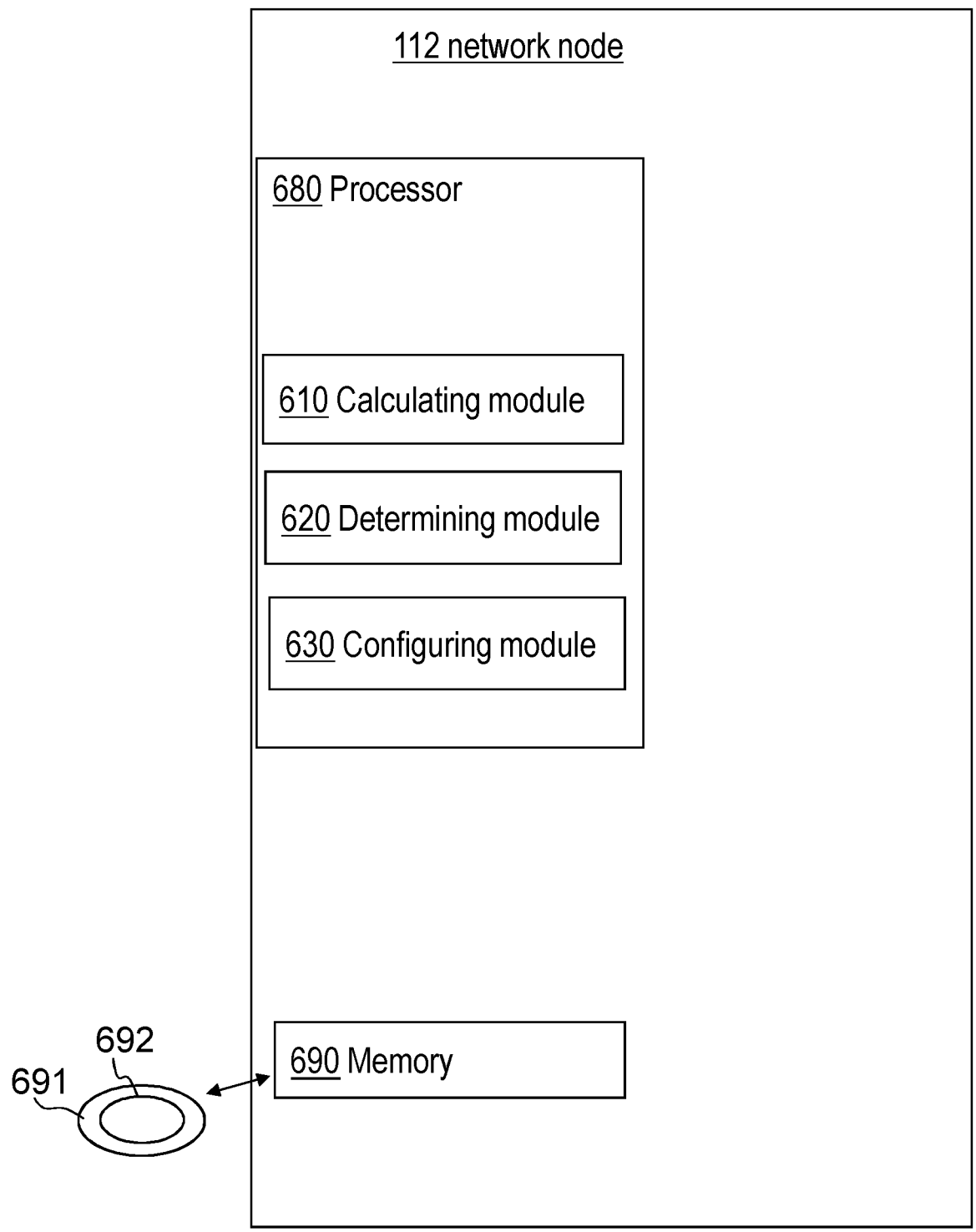
FIG. 6 is a block diagram illustrating embodiments of a network node.

To perform the method actions for determining the reporting threshold related to proximity based positioning in the wireless communications network 100 in the first scenario described above in relation to FIGS. 3 and 5, the network node 112 comprises the following arrangement depicted in FIG. 6.

The network node 112 is configured to, e.g. by means of a calculating module 610 configured to, for each of the plurality of candidate reporting thresholds calculate the corresponding localization accuracy metric based on:

the deployment information related to the deployment of the wireless communications network 100, the evaluation position related to the evaluation of the received signal, the propagation model relating the evaluation position and the evaluation of the received signal, and the respective candidate reporting threshold.

In some embodiments the network node 112 is further configured to calculate the corresponding localization accuracy metric for the plurality of evaluation positions.

The localization accuracy metric may be the localization RMSE.

In some embodiments the localization RMSE is calculated based on the CRB analysis.

The propagation model may be the RSS model.

The deployment information may comprise any one or more out of: the transmitter location, the transmitter power and building information.

The calculating module 610 may be implemented by a processor 680 in the network node 112.

The network node 112 is further configured to, e.g. by means of a determining module 620 configured to, determine the reporting threshold based on the plurality of corresponding localization accuracy metrics.

In some embodiments the network node 112 is further configured to determine the reporting threshold based on that the corresponding localization accuracy metric fulfils the requirement related to localization accuracy. For example, the network node 112 may be configured to determine the reporting threshold based on an optimization of the localization accuracy metric with respect to the reporting threshold.

The determining module 620 may be implemented by the processor 680 in the network node 112.

The network node 112 may further be configured to, e.g. by means of a configuring module 630 configured to, configure the wireless communications device 120 with the reporting threshold.

The configuring module 630 may be implemented by the processor 680 in the network node 112.

Figure 8:
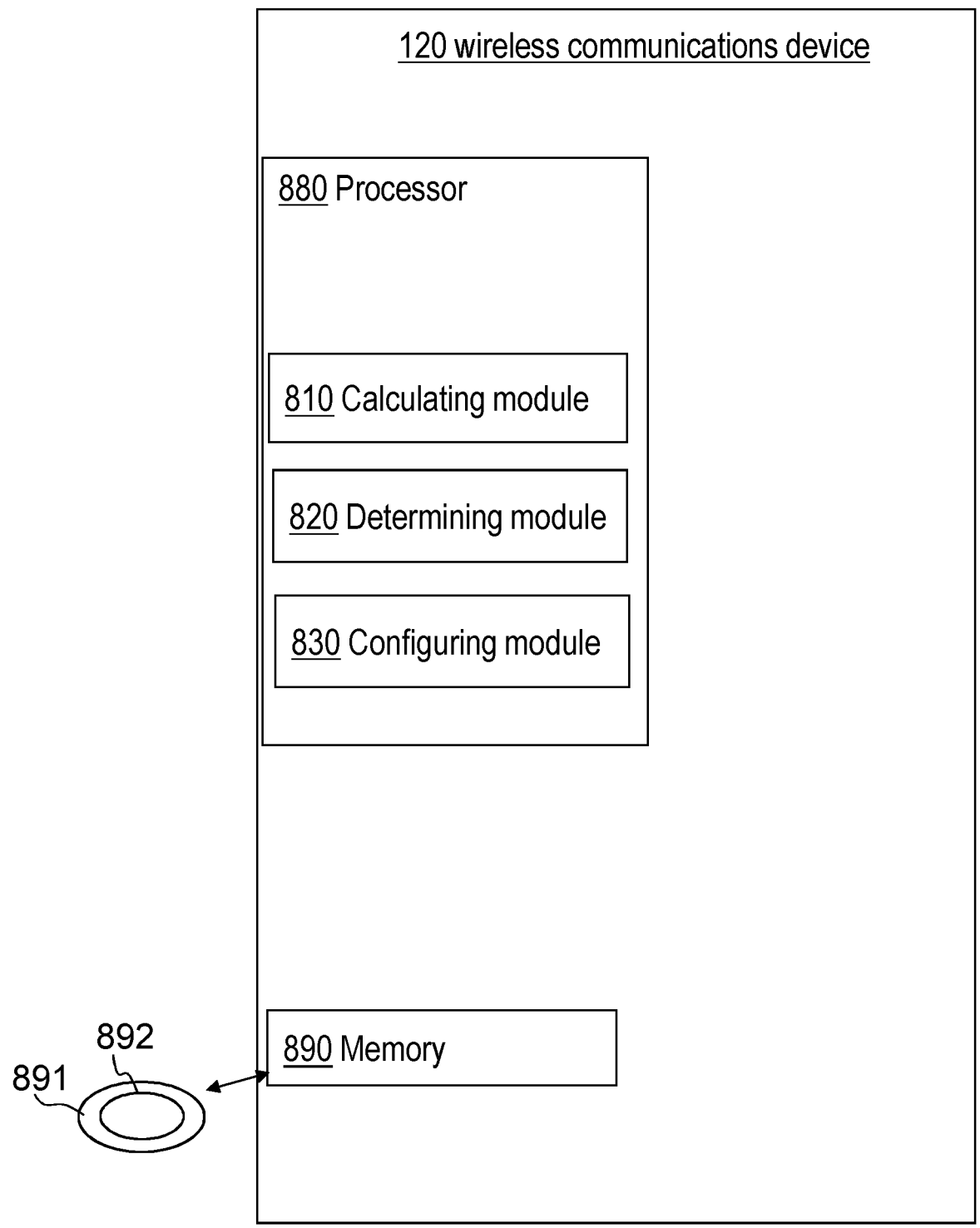
FIG. 8 is a block diagram illustrating embodiments of a wireless communications device.

To perform the method actions for determining the reporting threshold related to proximity based positioning in the wireless communications network 100 in the second scenario described above in relation to FIGS. 4 and 7, the wireless communications device 120 comprises the following arrangement depicted in FIG. 8.

The wireless communications device 120 is configured to, e.g. by means of a calculating module 810 configured to, for each of the plurality of candidate reporting thresholds calculate the corresponding localization accuracy metric based on:

the deployment information related to the deployment of the wireless communications network 100, the evaluation position related to the evaluation of the received signal, the propagation model relating the evaluation position and the evaluation of the received signal, and the respective candidate reporting threshold.

In some embodiments the wireless communications device 120 is further configured to calculate the corresponding localization accuracy metric for the plurality of evaluation positions.

The localization accuracy metric may be the localization RMSE.

In some embodiments the localization RMSE is calculated based on the CRB analysis.

The propagation model may be the RSS model.

The deployment information may comprise any one or more out of: the transmitter location, the transmitter power and building information.

The calculating module 810 may be implemented by a processor 880 in the wireless communications device 120.

The wireless communications device 120 is further configured to, e.g. by means of a determining module 820 configured to, determine the reporting threshold based on the plurality of corresponding localization accuracy metrics.

In some embodiments the wireless communications device 120 is further configured to determine the reporting threshold based on that the corresponding localization accuracy metric fulfils the requirement related to localization accuracy. For example, the wireless communications device 120 may be configured to determine the reporting threshold based on an optimization of the localization accuracy metric with respect to the reporting threshold.

The determining module 820 may be implemented by the processor 880 in the wireless communications device 120.

The wireless communications device 120 may further be configured to, e.g. by means of a configuring module 830 configured to, configure the wireless communications device 120 with the reporting threshold.

The configuring module 830 may be implemented by the processor 880 in the wireless communications device 120.

The embodiments herein for determining the reporting threshold related to proximity based positioning in the wireless communications network 100 may be implemented through one or more processors, such as the processor 680 in the network node 112 depicted in FIG. 6, and the processor 880 in the wireless communications device 120 depicted in FIG. 8, together with computer program code for performing the functions and actions of the embodiments herein. The program code mentioned above may also be provided as a computer program product 691, 891 for instance in the form of a data carrier carrying computer program code 692, 892 for performing the embodiments herein when being loaded into the network node 112 and/or the wireless communications device 120. One such carrier may be in the form of a CD ROM disc. It is however feasible with other data carriers such as a memory stick. The computer program code may furthermore be provided as pure program code on a server and downloaded to.

Thus, the methods according to the embodiments described herein for the network node 112 and/or the wireless communications device 120 may be implemented by means of a computer program product, comprising instructions, i.e., software code portions, which, when executed on at least one processor, cause the at least one processor to carry out the actions described herein, as performed by the network node 112 and/or the wireless communications device 120. The computer program product may be stored on a computer-readable storage medium. The computer-readable storage medium, having stored there on the computer program, may comprise the instructions which, when executed on at least one processor, cause the at least one processor to carry out the actions described herein, as performed by the core network node 231. In some embodiments, the computer-readable storage medium may be a non-transitory computer-readable storage medium.

Those skilled in the art will also appreciate that the calculating module 610, 810, the determining module 620, 820 and the configuring module 630, 830 described above may refer to a combination of analogue and digital circuits, and/or one or more processors configured with software and/or firmware, e.g. stored in a memory 680, 880 that when executed by the one or more processors such as the processor 680, 880 perform as described above. One or more of these processors, as well as the other digital hardware, may be included in a single ASIC, or several processors and various digital hardware may be distributed among several separate components, whether individually packaged or assembled into a SoC.

Further Details of the RSS Modelling which May be Used in Embodiments Herein

Linear Log-Distance Model

The classical linear log-distance model is given by $$r_j = \underbrace{A + 10B\log_{10}\left(\frac{d_j}{d_0}\right)}_{\mu_j} + e_j, j = 1, 2, \ldots, M$$

where $r_j$ is an RSS value in dBm, B is a path loss exponent, and $d_j$ is a short-hand notation of the Euclidean distance between a calibration position $p_j$ and the reference network node's position $p_r$, A is the RSS at a reference distance $d_0$ and $e_j$ is the error. Often, $r_j$ is assumed to be Gaussian distributed, i.e., $r_j \sim N(\mu_j, \sigma^2)$.

Given a calibration set of M RSS measurements, and performing the conventional linear least-squares (LLS) fitting yields an estimate $\hat{\theta}$ of the unknown parameters $[A, B]^T$, namely, $$[\hat{A}, \hat{B}]^T = \underset{[A,B]}{\arg\min} \sum_{j=1}^{M} (r_j - \mu_j)^2.$$

After having resolved $\hat{\theta}$, it is further possible to compute an estimate of the noise variance by $$\hat{\sigma}^2 = \frac{1}{M} \sum_{j=1}^{M} \left(r_j - \hat{A} - 10\hat{B}\log_{10}\left(\frac{d_j}{d_0}\right)\right)^2.$$

In practice, the RSS measurements in the calibration set were collected subject to a threshold, $P_{dec}$ in dBm, beyond which the reference network node signal cannot be received or decoded accurately. More accurate fitting results may be obtained by taking into account this truncation effect, since the truncation operation will limit effects of small-scale fading. Small-scale fading is also known as fast fading. A corresponding effect is fluctuating received signal strength due to constructive or deconstructive interference of a multiple of received signal waveforms resulting from a multipath propagation. Small-scale fading may make the validity of an empirical RSS model extremely erroneous, especially when the transmit power is low.

Therefore, embodiments herein may alleviate the impact of the small-scale fading on the observed received-signal-strength, especially when the transmit power of a reference network node is set low, e.g. in order to prolong battery life.

The corresponding log-likelihood function may be expressed as $$ll(A, B, \sigma^2) \triangleq \sum_{j=1}^{M} \ln\left\{\frac{\frac{1}{\sqrt{2\pi\sigma^2}}\exp[-(r_j - \mu_j)^2/2\sigma^2]}{\frac{1}{2}\left[1 - \text{erf}\left(\frac{P_{dec} - \mu_j}{\sqrt{2\sigma^2}}\right)\right]}\right\}.$$

A set of parameter estimates may be found through maximizing the above log-likelihood function, namely, $$\hat{\theta} = [\hat{A}, \hat{B}, \hat{\sigma}^2] = \underset{[A,B,\sigma^2]}{\arg\max} \; ll(A, B, \sigma^2).$$

The fitting results given in above may be used as a starting point for the above numerical search.

Piece-Wise Linear Log-Distance Model

As a second example, consider the following dual-slope piece-wise log-distance model:

$$r_j = \begin{cases} A_1 + 10B_1\log_{10}\left(\dfrac{d_j}{d_0}\right) + e_{1,j}, & d_j \le d_c \\ A_1 + 10B_1\log_{10}\left(\dfrac{d_c}{d_0}\right) + 10B_2\log_{10}\left(\dfrac{d_j}{d_c}\right) + e_{2,j}, & d_j > d_c \end{cases}$$

where $d_c$ is often called critical distance in the literature. Dual-slope model is characterized by a path loss factor $A_1$ and a path loss exponent $B_1$ from the reference distance $d_0$ up to the critical distance $d_c$. Beyond $d_c$ the RSS falls off with another path loss exponent $B_2$.

Calibration of the model parameters may be done as follows. For the calibration set of RSS measurements with $d_j < d_c$ the conventional LLS fitting, without considering the truncation effect, is used to calculate $\hat{A}_1$, $\hat{B}_1$ and $\hat{\sigma}_1^2$. As the truncation effect is more obvious for those RSS data with $d_j > d_c$, a set of parameter estimate, $\hat{B}_2$ and $\hat{\sigma}_2^2$ may be obtained through maximizing the following log-likelihood function with respect to $B_2$ and $\hat{\sigma}_2^2$ $$ll(B_2, \sigma_2^2) = \sum_{j=1}^{M_2} \ln\left\{ \dfrac{\dfrac{1}{\sqrt{2\pi\sigma_2^2}}\exp[-(r_j - \mu_{2,j})^2 / 2\sigma_2^2]}{\dfrac{1}{2}\left[1 - \mathrm{erf}\left(\dfrac{P_{dec} - \mu_{2,j}}{\sqrt{2\sigma_2^2}}\right)\right]} \right\}$$

where
$\mu_{2,j} \triangleq \hat{A}_1 + 10\hat{B}_1 \log_{10}(d_c/d_0) + 10B_2 \log_{10}(d_j/d_c)$
and for convenience the data are sorted so that the first $M_2$ elements have $d_j > d_c$. A complete set of the calibrated parameters is obtained as $\hat{\theta} = [\hat{A}_1, \hat{B}_1, \hat{B}_2, \hat{\sigma}_1^2, \hat{\sigma}_2^2]$.

Gaussian Process Regression Model

Next, nonlinear GPR is adopted to model RSS in a nonlinear way. The motivation lies in that for different geographical positions with the same Euclidean distance to one reference network node, the propagation channel conditions (line-of-sight or non-line-of-sight, richness of multi-paths, strength of reflections, and so on) may be different. The underlying RSS may be represented as a real-valued Gaussian process, $r(p)$, in terms of 2-D or 3-D geographical position rather than 1-D Euclidean distance. By ignoring the subscript j, the function view of a nonlinear GPR model is given as follows:

$$r(p) = A + 10B\log_{10}\left(\dfrac{\|p - p_r\|}{d_0}\right) + e(p)$$

where A and B follow the same meanings as given in the first example. The error term, $e(p)$, due to the large-scale shadowing effect follows a zero-mean Gaussian distribution $$e(p) \approx \mathcal{N}(0, \sigma_s^2).$$

However, in contrast to the independence assumption made in the previous two examples, the measurement errors (due to the shadowing effect) observed at two positions, say p and p', may correlate in space according to the well-established Gudmundson's model, namely $$\mathbb{E}[e(p)e(p')] = \sigma_s^2 \cdot \exp\left[\dfrac{-\|p - p'\|}{l_c}\right]$$

where $l_c$ stands for the correlation distance.

The above GPR model of the underlying RSS may be completely specified by its mean function and covariance function, namely $$r(p) \approx GP(m(p), k(p, p'))$$

where $$m(p) \triangleq \mathbb{E}[r(p)] = A + 10B\log_{10}\left(\dfrac{\|p - p_r\|}{d_0}\right).$$

$$k(p \cdot p') \triangleq \mathbb{E}[(r(p) - m(p))(r(p') - m(p'))] = \mathbb{E}[c(p)c(p')]$$

For calibration, consider the calibration set, denoted as $$\mathcal{D} = \{(p_j, y(p_j)) | j = 1, 2 \ldots M\}$$

which may be collected, may be sparsely, at different calibration locations $p_j$ in a calibration phase. To be realistic, it is assumed that the observed RSS is of the form $$y(p_j) = r(p_j) + n_j, j = 1, 2 \ldots M.$$

Herein, the noise terms $n_j = 1, 2, \ldots, M$ are assumed to be independently and identically Gaussian distributed with zero mean and variance $\sigma_n^2$ accounting for the joint influence of the interference from other devices, signal absorption from human bodies, as well as any unsuccessfully removed small-scale fading.

The likelihood function of the observed RSS measurements in the calibration set may be expressed as $$p(y(P); \theta) \sim \mathcal{N}(m(P) \cdot C(P,P))$$

where the following notations are newly introduced:

$$\theta = [A, B, \sigma_s^2, \sigma_n^2, l_c]^T,$$

$$P \triangleq [p_1, p_2, \ldots, p_M],$$

$$y(P) \triangleq [y(p_1), y(p_2), \ldots, y(p_M)]^T,$$

$$m(P) \triangleq [m(p_1), m(p_2), \ldots, m(p_M)]^T,$$

$$K(P, P) \triangleq \begin{bmatrix} k(p_1, p_1) & k(p_1, p_2) & \ldots & k(p_1, p_M) \\ k(p_2, p_1) & k(p_2, p_2) & \ldots & k(p_2, p_M) \\ \vdots & \vdots & \ddots & \vdots \\ k(p_M, p_1) & k(p_M, p_2) & \ldots & k(p_M, p_M) \end{bmatrix}.$$

$$C(P, P) \triangleq K(P, P) + \sigma_n^2 \cdot I_M.$$

The parameters included in $\theta$ are usually unknown and need to be calibrated. A parameter estimate $\hat{\theta}$ may be found through maximizing the likelihood function above numerically using for instance the Limited-memory Broyden-Fletcher-Goldfarb-Shanno (LBFGS) quasi-Newton method or the conjugate gradient method. The obtained $\hat{\theta}$ is treated then as the true parameters in the sequel.

In order to give a training data dependent RSS model that takes into account all error sources, the Gaussian posterior probability of an observed RSS value is computed at any position by $$p(y(p_*) | \mathcal{D}; \theta) \sim \mathcal{N}(\bar{\mu}(p_*) \cdot \bar{k}(p_*))$$

where $\bar{\mu}(p_*, P) \mathcal{N} [k(p^*, p_1), k(p_*, p_2) \ldots k(p_*, p_M)]^T.$
and
$\bar{k}(p_*) = \sigma_n^2 + \sigma_s^2 - k^T(p_*, P) C^{-1}(P \cdot P) k(p_*, P).$ Note that above $k(p_*, P)$ is defined as
$$k(p_*,P) \triangleq [k(p_*,p_1), k(p_*,p_2) \ldots k(p_*,p_M)]^T.$$

Details of the Calculation of the FIM

Below, the FIM for estimating an unknown deterministic position $p=[x, y, z]^T$, will be computed based on the proximity information converted from the RSS measurements, more precisely, $$c_i = \begin{cases} 0, & r_i \leq P_{th} \\ 1, & r_i > P_{th} \end{cases}$$

where $c_i$ is introduced here to denote the proximity information obtained through comparing a threshold $P_{th}$ with the instantaneous RSS value, $r_i$, measured at a receiver in communication with the ith reference network node. $c_i$ being equal to '0' indicates that the receiver is not connected with network node i or '1' indicates a successful connection of them. Given the whole batch of RSS measurements collected after the offline phase, the FIM computation may be performed either in the receiver, e.g. in the wireless communications device 120, or in the network node 112, such as a radio base station, a BLE beacon or a Wi-Fi router, or in a fusion center. However, the computation remains the same in these different cases.

The FIM for estimating p is defined as FIM(p), which may be easily proven to be equal to $$FIM(p) = \sum_{i=1}^{N} FIM_i(p),$$

owing to the independence assumption on the measurements collected from different network nodes. Hence, it is much simpler to work with $$FIM_i(p) \triangleq \mathbb{E}[\nabla_p \ln(Pr\{c_i;p,P_{th}\})\nabla_p^T \ln(Pr\{c_i;p,P_{th}\})]$$

where the expectation is taken with respect to a discrete-valued probability $Pr\{c_i; p, P_{th}\}$. Next it is only shown how to compute $Pr\{c_i; p, P_{th}\}$ for the linear log-distance RSS model, and the results remain similar for the other two RSS models. The nice statistical property in common is the Gaussian distribution of a RSS measurement.

Linear Log-Distance Model

Owing to the Gaussian nature of the RSS, namely,
$$r_i \sim \mathcal{N}(\hat{\mu}_i(p), \hat{\sigma}_i^2),$$
where $$\hat{\mu}_i(p) \triangleq \hat{A}_i + 10\hat{B}_i \log_{10}\left(\frac{\|p - p_r\|}{d_0}\right),$$

$$Pr\{c_i; p, P_{th}\} = \begin{cases} G\left(\dfrac{P_{th} - \hat{\mu}_i(p)}{\hat{\sigma}_i}\right), & c_i = 0 \\ 1 - G\left(\dfrac{P_{th} - \hat{\mu}_i(p)}{\hat{\sigma}_i}\right), & c_i = 1 \end{cases},$$

where $$G\left(\frac{t-\mu}{\sigma}\right) \triangleq \frac{1}{2}\left[1 + \mathrm{erf}\left(\frac{t-\mu}{\sqrt{2}\,\sigma}\right)\right].$$

It is easy to derive that $$FIM_i(p) \triangleq \begin{bmatrix} f_{i,xx} & f_{i,xy} & f_{i,xz} \\ f_{i,yx} & f_{i,yy} & f_{i,yz} \\ f_{i,zx} & f_{i,zy} & f_{i,zz} \end{bmatrix}$$

where for any combination of $m \in \{x, y, z\}$ and $n \in \{x, y, z\}$ $$f_{i,mn} = E\left[\frac{\frac{\partial}{\partial m} Pr\{c_i;p,P_{th}\}}{Pr\{c_i;p,P_{th}\}} \cdot \frac{\frac{\partial}{\partial n} Pr\{c_i;p,P_{th}\}}{Pr\{c_i;p,P_{th}\}}\right]$$

$$= \sum_{c_i \in \{0,1\}} \frac{\frac{\partial}{\partial m} Pr\{c_i;p,P_{th}\} \cdot \frac{\partial}{\partial n} Pr\{c_i;p,P_{th}\}}{Pr\{c_i;p,P_{th}\}}$$

$$= \left(\frac{\partial G}{\partial m} \cdot \frac{\partial G}{\partial n}\right) \cdot \left(\frac{1}{G} + \frac{1}{1-G}\right).$$

Note that G is a short-hand notation of $$G\left(\frac{P_{th} - \hat{\mu}_i(p)}{\hat{\sigma}_i}\right)$$

in the above expressions. It is easy to verify that $$f_{i,xy} = f_{i,yx}, f_{i,xz} = f_{i,zx}, f_{i,yz} = f_{i,zy}.$$

It is easy to verify further that $$\frac{\partial G}{\partial m} \equiv \frac{\partial}{\partial m}\left\{\frac{1}{2}\mathrm{erf}\left(\frac{P_{th} - \hat{\mu}_i(p)}{\sqrt{2}\,\hat{\sigma}_i}\right)\right\}$$

$$= \frac{-10\hat{B}_i}{\ln(10)\sqrt{2\pi}\,\hat{\sigma}_i} \exp\left[-\frac{(P_{th} - \hat{\mu}_i(p))^2}{2\hat{\sigma}_i^2}\right]\frac{m - m_{r,i}}{\|p - p_{r,i}\|^2}.$$

Inserting the result obtained in (A-4) into (A-3) and performing some algebraic manipulations yields $$f_{i,mn} = C_1 \cdot \frac{(m - m_{r,i})(n - n_{r,i})}{\|p - p_{r,i}\|^4}$$

where $C_1$ is a variable in terms of the calibrated RSS model parameters and the RSS threshold, more precisely, $$C_1 = \frac{200\hat{B}_i^2}{\pi\hat{\sigma}_i^2 \ln^2(10)} \cdot \frac{\exp\left[\dfrac{-(P_{th} - \hat{\mu}_i(p))^2}{\hat{\sigma}_i^2}\right]}{1 - \mathrm{erf}^2\left(\dfrac{P_{th} - \hat{\mu}_i(p)}{\sqrt{2}\,\hat{\sigma}_i}\right)}.$$

Combining the results in (A-5), (A-2), and (A-1), it is straightforward to obtain a final expression of $FIM(p_+)$, which is omitted here.

Experimental Validation in BLE Network

The embodiments herein are corroborated by experimental data using a batch of real RSS measurements collected in an indoor BLE network. The most attractive features of the BLE network as compared to other wireless networks may lie in the low power consumption and maintenance cost. As trade-off, more BLE beacons may be needed due to a shorter communication range.

The experimental validation will be presented below.

Sensor Deployment and Measurement Campaign

Figure 9:
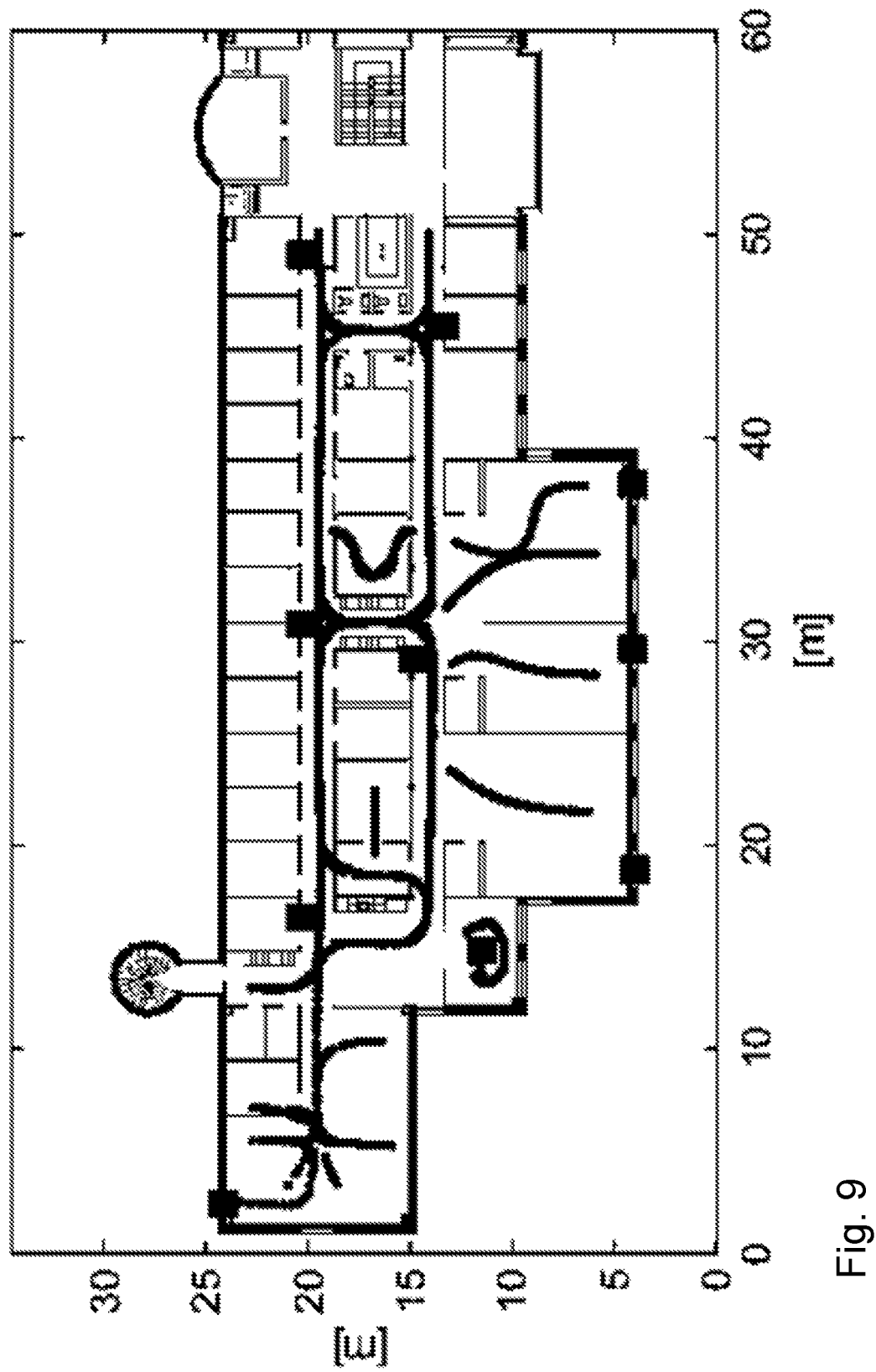
FIG. 9 is a schematic block diagram illustrating a deployment of a wireless communications network and a calibration set of positions.

A total number of N=10 BLE beacons are placed rather uniformly in a typical office environment. The floor plan as well as the known beacon positions are shown as black squares in two-dimensional (2-D) space in FIG. 9, which illustrates an example deployment and a calibration set of positions. Herein, a local coordinate system is used. The BLE beacons serve as transmitters with transmitted power $P_T$=−58 dBm and broadcast data packages continuously. A moderate scale measurement campaign was conducted during normal work hours. Throughout the measurement campaign, a mobile phone equipped with a BLE chipset received data packages from the BLE beacons and measured the RSS. As a consequence, a total number of M=12144 RSS measurements were collected along 52 predefined tracks. Only one RSS measurement was recorded for each location. During the measurement campaign, the logging device, i.e. the mobile phone, was held approximately 1.3 meter above the ground. For clarity, the 52 tracks are depicted all together in FIG. 9.

Fitted RSS Models

Figure 10:
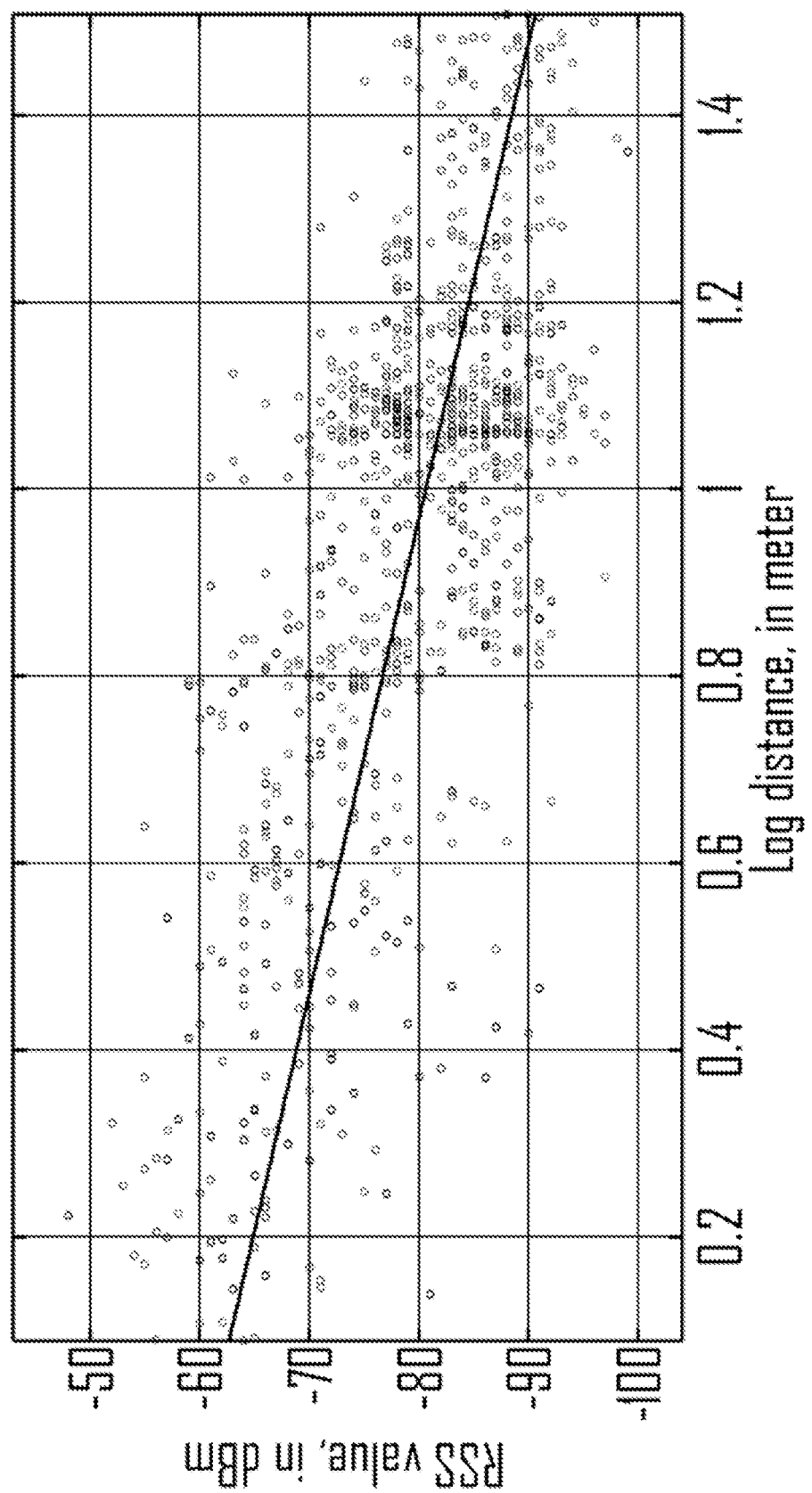
FIG. 10 is a diagram illustrating RSS measurement data and a linear log-distance model.
Figure 11:
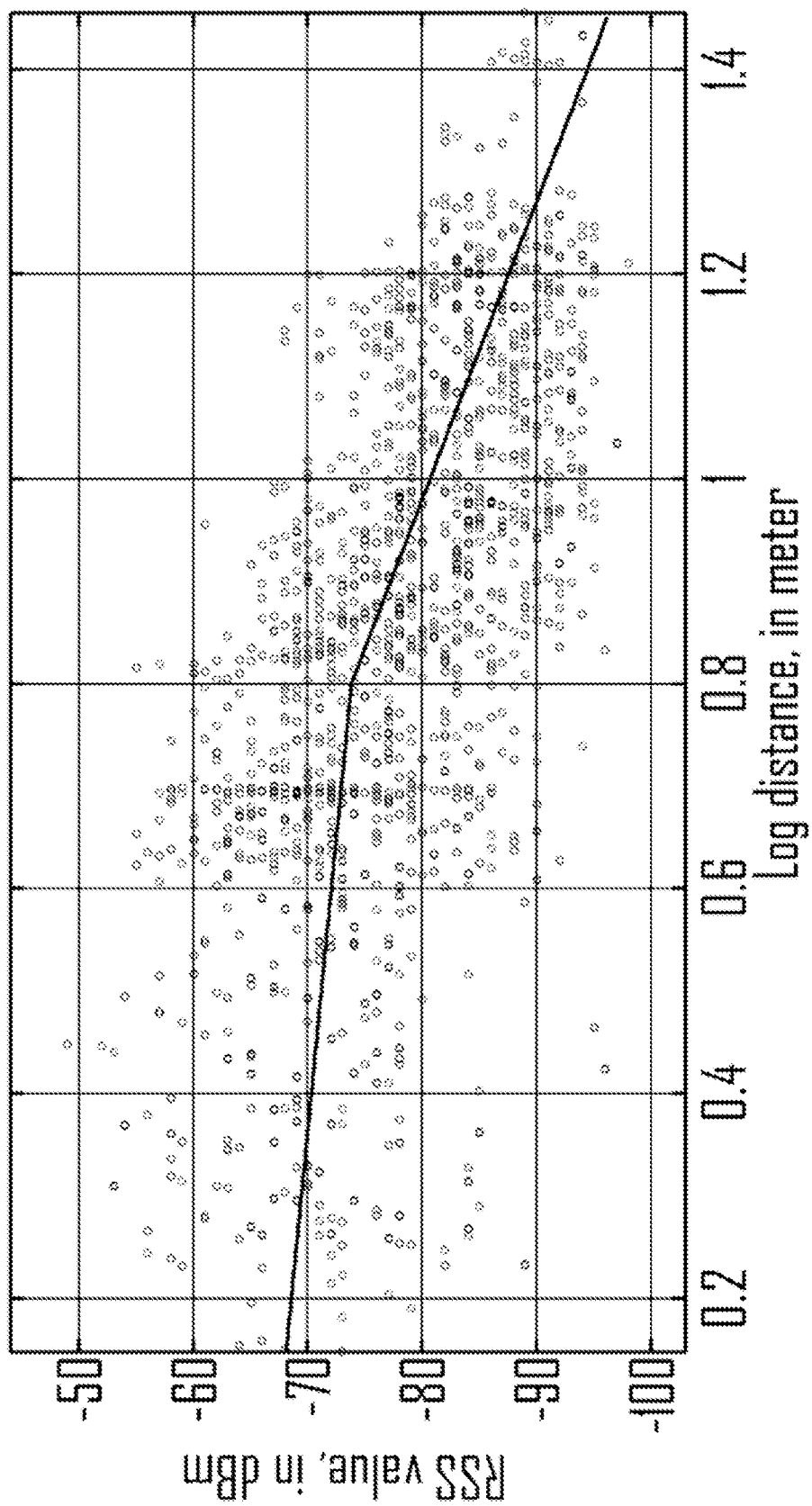
FIG. 11 is a diagram illustrating RSS measurement data and a piece-wise linear log-distance model.

Above three representative RSS models were given as examples of RSS models. They are the conventional linear log-distance model, piece-wise linear log-distance model, as well as a more advanced nonlinear GPR model. The truncation effect is considered for the first two linear models by setting the truncation threshold to $P_{dec}$=−99 dBm. Next, RSS model calibration is performed repeatedly for each BLE beacon using the real measurements. Specifically, a calibrated linear log-distance model is shown for the 9$^{th}$ beacon in FIG. 10, and a calibrated dual-mode piece-wise linear model for the 4$^{th}$ beacon is shown in FIG. 11.

RSS Thresholding Results

Figure 12:
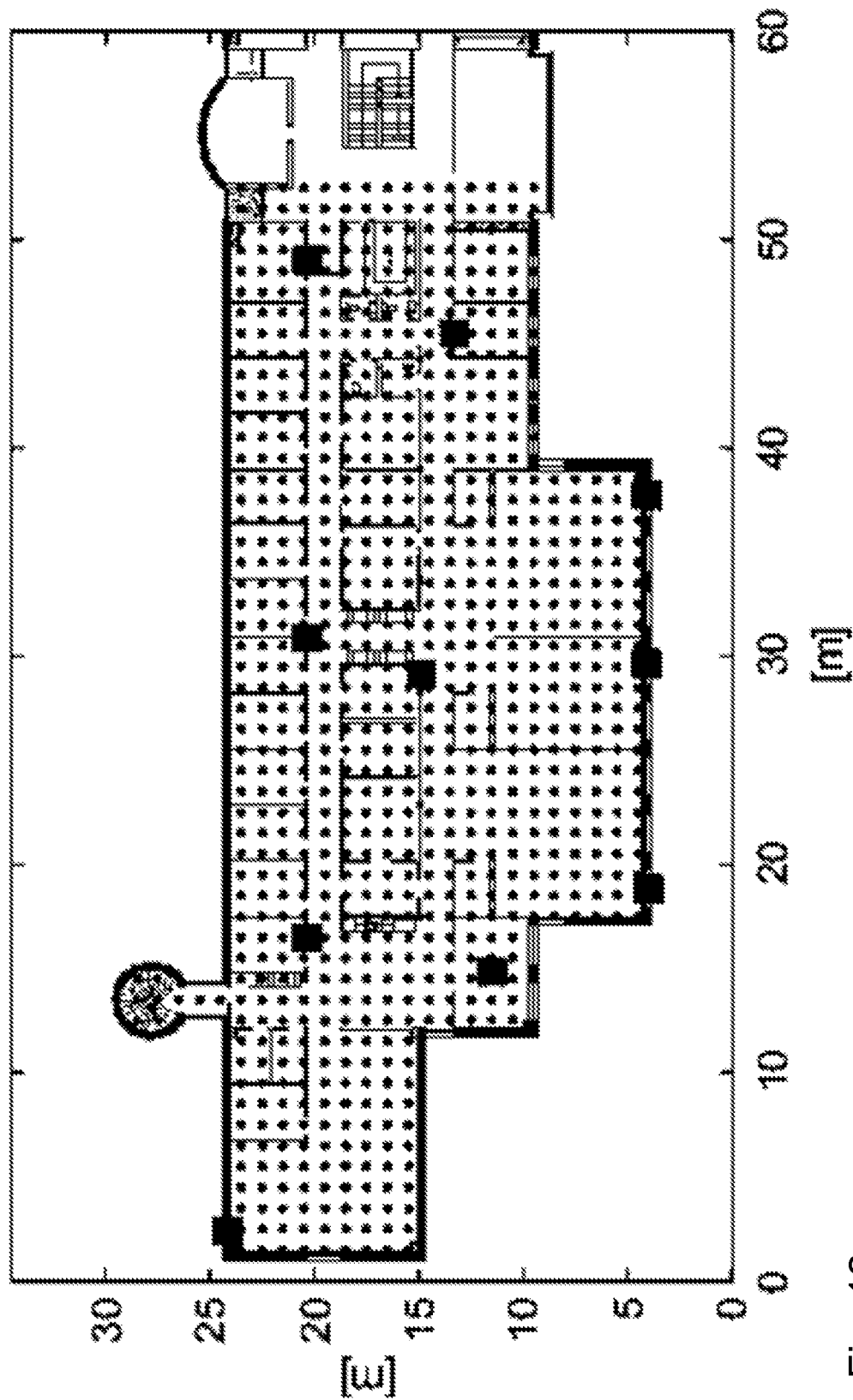
FIG. 12 is a schematic block diagram illustrating a deployment of a wireless communications network and an evaluation set of positions.

In order to perform the RSS thresholding, an evaluation set X* with 3083 evaluation positions spread uniformly over the service area is first generated. FIG. 12 illustrates the evaluation positions in the evaluation set.

Figure 13:
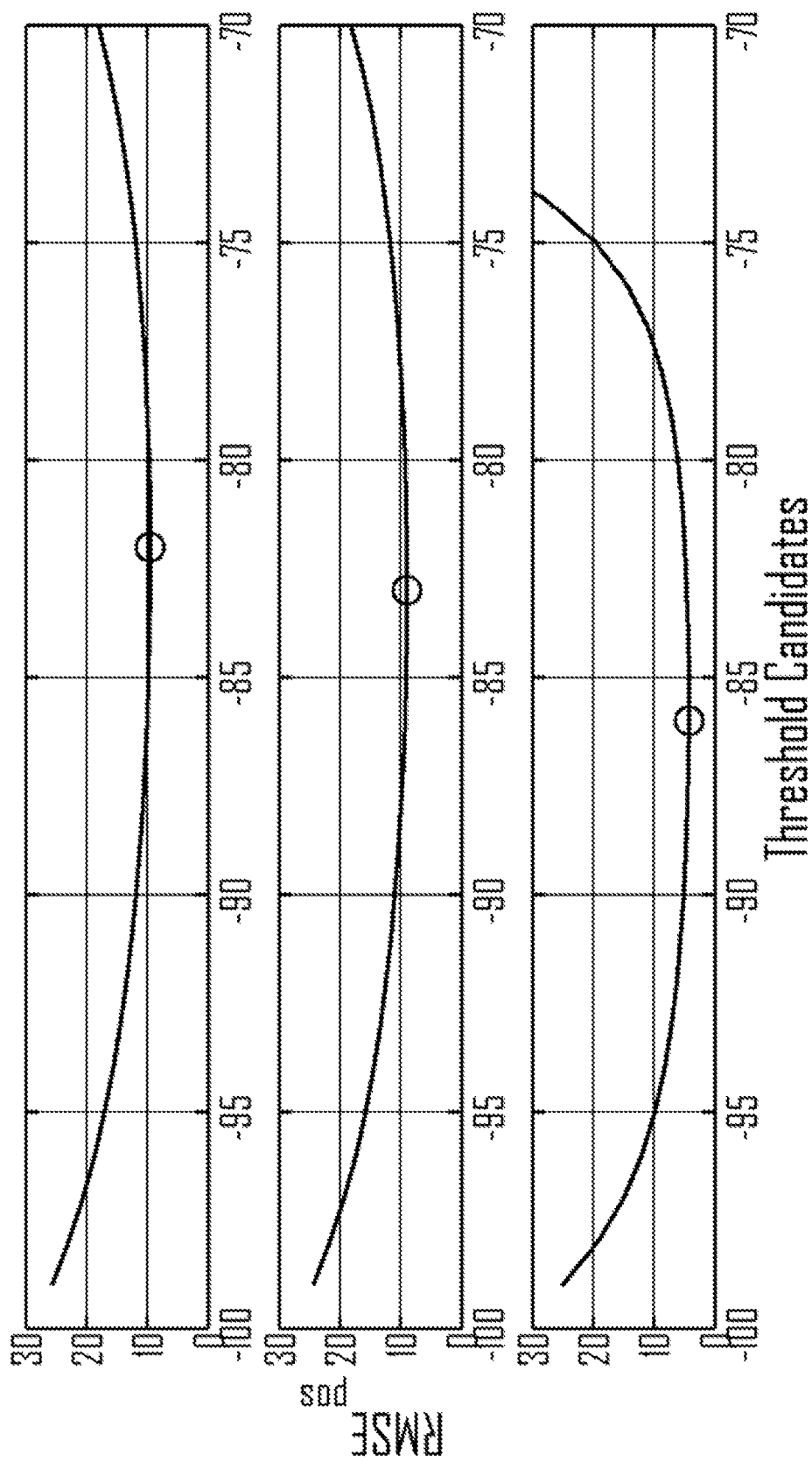
FIG. 13 is a diagram illustrating localization root-mean-square-error versus threshold candidates.

The weighting factors are set equally as $$w_i^* = \frac{1}{|X^*|}$$

for all sample positions in X*. The readers should not confuse this sample set X* with the calibration set shown in FIG. 9 and used for RSS model calibration. Here, the sample positions are assumed to be deterministic and the CRB computation is performed in a snapshot-based manner. Considering CRB as a location accuracy metric and an average over all positions of the evaluation set as the statistical metric for the three different RSS models yields determined RSS thresholds. The overall best achievable localization RMSE is depicted in FIG. 13 as a function of the RSS reporting threshold $P_{th}$, which ranges from $P_{th}^{min}$=−99 dBm to $P_{th}^{max}$=−70 dBm with an increment 1 dBm. It is not surprising to see the convex profiles of $\overline{RMSE}_{pos}(P_{th})$ with respect to $P_{th}$ in all cases. The reason is that too big or too small threshold gives very little information about a location. In order to better explain this, the example shown in FIG. 1 is used.

Therein, when $P_{th}^{opt}$ is set to −∞ or equivalently the coverage area is infinitely large, the receiver will receive [1,1] everywhere; Similarly, when $P_{th}^{opt}$ is set to +∞ or equivalently the coverage area is null, the receiver will receive [0,0] everywhere. It is also observed that the resulting RSS thresholds coincide with each other despite the use of different models.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from Bluetooth has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node should be considered to be non-limiting and does in particular not imply a certain hierarchical relation between the two.

The invention claimed is:

1. A method performed by a network node for determining a reporting threshold related to proximity based positioning in a wireless communications network, the method comprising:
    obtaining a propagation model, wherein the propagation model is a Received Signal Strength (RSS) model;
    obtaining deployment information relating to deployment of reference network nodes serving as transmitters in the wireless communications network and comprising any one or more out of: a transmitter location, a transmitter power and a building information;
    for each of a plurality of candidate reporting thresholds calculating a corresponding localization accuracy metric based on:
        the deployment information related to a deployment of the wireless communications network;
        an evaluation position related to the evaluation of a received signal;
        a propagation model relating the evaluation position and the evaluation of the received signal; and
        the respective candidate reporting threshold; and
    determining the reporting threshold based on the plurality of corresponding localization accuracy metrics,
    wherein determining the reporting threshold is further based on that the corresponding localization accuracy metric fulfils a requirement related to localization accuracy or an optimization of the localization accuracy metric with respect to the reporting threshold.

2. The method according to claim 1, wherein the corresponding localization accuracy metric is related to a plurality of evaluation positions.

3. The method according to claim 1, wherein the localization accuracy metric is a localization Root-Mean-Square-Error, RMSE.

4. The method according to claim 1, wherein the localization RMSE is calculated based on a Cramer-Rao Bound, CRB, analysis.

5. The method according to claim 1, further comprising: configuring a wireless communications device with the reporting threshold.

6. A network node for determining a reporting threshold related to proximity based positioning in a wireless communications network, the network node is being configured to:
obtain a propagation model, wherein the propagation model is a Received Signal Strength (RSS) model;
obtain deployment information relating to deployment of reference network nodes serving as transmitters in the wireless communications network and comprising any one or more out of: a transmitter location, a transmitter power and a building information;
for each of a plurality of candidate reporting thresholds calculate a corresponding localization accuracy metric based on:
the deployment information related to a deployment of the wireless communications network;
an evaluation position related to the evaluation of a received signal;
a propagation model relating the evaluation position and the evaluation of the received signal; and
the respective candidate reporting threshold; and
determine the reporting threshold based on the plurality of corresponding localization accuracy metrics,
wherein the reporting threshold based on that the corresponding localization accuracy metric fulfils a requirement related to localization accuracy or an optimization of the localization accuracy metric with respect to the reporting threshold.

7. The network node according to claim 6, further configured to:
for each of the plurality of candidate reporting thresholds, calculate a corresponding localization accuracy metric for a plurality of evaluation positions.

8. The network node according to claim 6, wherein the localization accuracy metric is a localization Root-Mean-Square-Error, RMSE.

9. The network node according to claim 6, wherein the localization RMSE is calculated based on a Cramer-Rao Bound, CRB, analysis.

10. The network node according to claim 6, further configured to:
configure a wireless communications device with the reporting threshold.

11. A method performed by a wireless communications device for determining a reporting threshold related to proximity based positioning in a wireless communications network, the method comprising:
obtaining a propagation model, wherein the propagation model is a Received Signal Strength (RSS) model;
obtaining deployment information relating to deployment of reference network nodes serving as transmitters in the wireless communications network and comprising any one or more out of: a transmitter location, a transmitter power and a building information;
for each of a plurality of candidate reporting thresholds calculating a corresponding localization accuracy metric based on:
the deployment information related to a deployment of the wireless communications network;
an evaluation position related to the evaluation of a received signal;
a propagation model relating the evaluation position and the evaluation of the received signal; and
the respective candidate reporting threshold; and
determining the reporting threshold based on the plurality of corresponding localization accuracy metrics,
wherein determining the reporting threshold is further based on that the corresponding localization accuracy metric fulfils a requirement related to localization accuracy or an optimization of the localization accuracy metric with respect to the reporting threshold.

12. The method according to claim 11, wherein the corresponding localization accuracy metric is related to a plurality of evaluation positions.

13. The method according to claim 11, wherein the localization accuracy metric is a localization Root-Mean-Square-Error, RMSE.

14. The method according to claim 11, wherein the localization RMSE is calculated based on a Cramer-Rao Bound, CRB, analysis.

15. The method according to claim 11, further comprising:
configuring a second wireless communications device with the reporting threshold.

16. A wireless communications device for determining a reporting threshold related to proximity based positioning in a wireless communications network, the wireless communications device is being configured to:
obtain a propagation model, wherein the propagation model is a Received Signal Strength (RSS) model;
obtain deployment information relating to deployment of reference network nodes serving as transmitters in the wireless communications network and comprising any one or more out of: a transmitter location, a transmitter power and a building information;
for each of a plurality of candidate reporting thresholds calculate a corresponding localization accuracy metric based on:
the deployment information related to a deployment of the wireless communications network;
an evaluation position related to the evaluation of a received signal;
a propagation model relating the evaluation position and the evaluation of the received signal; and
the respective candidate reporting threshold; and
determine the reporting threshold based on the plurality of corresponding localization accuracy metrics,
wherein determine the reporting threshold based on that the corresponding localization accuracy metric fulfils a requirement related to localization accuracy or an optimization of the localization accuracy metric with respect to the reporting threshold.

17. The wireless communications device according to claim 16, further configured to:
for each of the plurality of candidate reporting thresholds calculate a corresponding localization accuracy metric for a plurality of evaluation positions.

18. The wireless communications device according to claim 16, wherein the localization accuracy metric is a localization Root-Mean-Square-Error, RMSE.

19. The wireless communications device according to claim 16, wherein the localization RMSE is calculated based on a Cramer-Rao Bound, CRB, analysis.

20. The wireless communications device according to claim 16, further configured to:
  configure a second wireless communications device with the reporting threshold.

* * * * *